United States Patent
Burowski et al.

(10) Patent No.: US 11,057,743 B2
(45) Date of Patent: Jul. 6, 2021

(54) MANY TO MANY RANGING TECHNIQUES

(71) Applicant: Apple Inc., Cupertino, CA (US)

(72) Inventors: Yagil Burowski, Mountain View, CA (US); Subash Marri Sridhar, San Jose, CA (US); Ayman Naguib, Cupertino, CA (US); Robert Golshan, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/784,022

(22) Filed: Feb. 6, 2020

(65) Prior Publication Data
US 2021/0076163 A1    Mar. 11, 2021

Related U.S. Application Data

(60) Provisional application No. 62/896,755, filed on Sep. 6, 2019, provisional application No. 62/931,667, filed on Nov. 6, 2019.

(51) Int. Cl.
*H04W 4/029*    (2018.01)
*H04W 4/02*    (2018.01)

(52) U.S. Cl.
CPC ........... *H04W 4/029* (2018.02); *H04W 4/023* (2013.01)

(58) Field of Classification Search
CPC .............................. H04W 4/029; H04W 4/023
USPC ........................................................ 455/456.1
See application file for complete search history.

(56) References Cited

U.S. PATENT DOCUMENTS

2009/0264137 A1* 10/2009 Soliman ................ G01S 5/0072
                                                                   455/456.1
2016/0183113 A1*  6/2016 Dua ...................... H04W 64/00
                                                                   370/329

* cited by examiner

*Primary Examiner* — William Nealon
(74) *Attorney, Agent, or Firm* — Kilpatrick, Townsend and Stockton LLP

(57) ABSTRACT

A mobile device can include ranging circuitry to determine distance to another mobile device. Ranging between multiple mobile devices can present challenges due to clock drift between the devices resulting in missed messages due to collisions between ranging messages. Techniques can be implemented to reduce the number of collisions by designating time slots for ranging sessions based on timing from a coordinator mobile device. Alternative techniques allow for splitting up channels at different time amount different pairs of devices. The ranging techniques can be used to share information between devices with a predefined distance for applications such as augmented reality.

22 Claims, 22 Drawing Sheets

| | Ch-1 | Ch-2 | Ch-3 | Ch-4 |
|---|---|---|---|---|
| | (1, 2) | (3, 4) | (5, 6) | (7, 8) |
| | (2, 3) | (4, 5) | (6, 7) | (8, 9) |
| | (9, 10) | (1, 3) | (2, 4) | (5, 7) |
| | (3, 5) | (4, 6) | (7, 9) | (8, 10) |
| | (6, 8) | (1, 4) | (2, 5) | (7, 10) |
| | (3, 6) | (4, 7) | (5, 8) | (1, 5) |
| | (6, 9) | (3, 7) | (4, 8) | (5, 10) |
| | (2, 6) | (5, 9) | (3, 8) | (1, 7) |
| | (6, 10) | (2, 7) | (4, 9) | (1, 8) |
| | (1, 6) | (2, 8) | (3, 9) | (4, 10) |
| | (2, 9) | (3, 10) | | |
| | (1, 9) | (2, 10) | | |
| | (1, 10) | | | |

FIG. 8

| Ch-1 (902) | Ch-2 (904) | Ch-3 (906) | Ch-4 (908) |
|---|---|---|---|
| (1, 2) | | | |
| (2, 3) | (4, 5) | (1, 10) | (8, 9) |
| (9, 10) | (1, 3) | (2, 4) | (5, 7) |
| (3, 5) | (4, 6) | (7, 9) | (8, 10) |
| (6, 8) | (1, 4) | (2, 5) | (7, 10) |
| (3, 6) | (4, 7) | (5, 8) | (1, 5) |
| (6, 9) | (3, 7) | (4, 8) | (5, 10) |
| (2, 6) | (5, 9) | (3, 8) | (1, 7) |
| (6, 10) | (2, 7) | (4, 9) | (1, 8) |
| (1, 6) | (2, 8) | (3, 9) | (4, 10) |
| (2, 9) | (3, 10) | (5, 6) | (7, 8) |
| (1, 9) | (2, 10) | (3, 4) | (6, 7) |

FIG. 9

| Ch-1 | Ch-2 | Ch-3 | Ch-4 | Ch-5 | Ch-6 |
|---|---|---|---|---|---|
| (1, 2) | (3, 4) | (5, 6) | (7, 8) | (9, 10) | |
| (2, 3) | (4, 5) | (6, 7) | (8, 9) | (1, 10) | |
| (1, 3) | (2, 4) | (5, 7) | (6, 8) | | |
| (3, 5) | (4, 6) | (7, 9) | (8, 10) | | |
| (1, 4) | (2, 5) | (3, 6) | (7, 10) | | |
| (4, 7) | (5, 8) | (6, 9) | (3, 10) | | |
| (1, 5) | (2, 6) | (3, 7) | (4, 8) | | |
| (5, 9) | (6, 10) | (2, 7) | (3, 8) | | |
| (1, 6) | (4, 9) | (5, 10) | (2, 8) | | |
| (1, 7) | (3, 9) | (4, 10) | | | |
| (1, 8) | (2, 9) | | | | |
| (1, 9) | (2, 10) | | | | |

FIG. 10

| Ch-1 | Ch-2 | Ch-3 | Ch-4 |
|---|---|---|---|
| (1, 2) | | | |
| (2, 3) | (4, 5) | (1, 10) | (8, 9) |
| (9, 10) | (1, 3) | (2, 4) | (5, 7) |
| (3, 5) | (4, 6) | (7, 9) | (8, 10) |
| (6, 8) | (1, 4) | (2, 5) | (7, 10) |
| (3, 6) | (4, 7) | (5, 8) | (1, 5) |
| (6, 9) | (3, 7) | (4, 8) | (5, 10) |
| (2, 6) | (5, 9) | (3, 8) | (1, 7) |
| (6, 10) | (2, 7) | (4, 9) | (1, 8) |
| (1, 6) | (2, 8) | (3, 9) | (4, 10) |
| (2, 9) | (3, 10) | (5, 6) | (7, 8) |
| (1, 9) | (2, 10) | (3, 4) | (6, 7) |

FIG. 12

| Ch-1 | Ch-2 | Ch-3 | Ch-4 |
|------|------|------|------|
| (1, 2) | | | |
| (2, 3) | (4, 5) | ~~(1, 10)~~ | ~~(8, 9)~~ |
| ~~(9, 10)~~ | (1, 3) | (2, 4) | (5, 7) |
| (3, 5) | (4, 6) | ~~(7, 9)~~ | ~~(8, 10)~~ |
| ~~(6, 8)~~ | (1, 4) | (2, 5) | ~~(7, 10)~~ |
| (3, 6) | (4, 7) | ~~(5, 8)~~ | (1, 5) |
| ~~(6, 9)~~ | (3, 7) | ~~(4, 8)~~ | ~~(5, 10)~~ |
| (2, 6) | ~~(5, 9)~~ | ~~(3, 8)~~ | ~~(1, 7)~~ |
| ~~(6, 10)~~ | ~~(2, 7)~~ | ~~(4, 9)~~ | ~~(1, 8)~~ |
| (1, 6) | ~~(2, 8)~~ | ~~(3, 9)~~ | ~~(4, 10)~~ |
| ~~(2, 9)~~ | ~~(3, 10)~~ | (5, 6) | ~~(7, 8)~~ |
| ~~(1, 9)~~ | ~~(2, 10)~~ | (3, 4) | ~~(6, 7)~~ |

FIG. 13

MANY TO MANY RANGING TECHNIQUES

CROSS-REFERENCES TO RELATED APPLICATIONS

This application claims the benefit of U.S. Provisional Patent Application No. 62/896,755, filed Sep. 6, 2019, and U.S. Provisional Patent Application No. 62/931,667, filed Nov. 6, 2019, are hereby incorporated by reference in their entirety and for all purposes.

BACKGROUND

Mobile devices (e.g., smart phone) can be used for augmented reality applications. Augmented reality is an environment where the objects in the real-world are enhanced by computer-generated perceptual information that can in include visual, auditory, and haptic modalities. Augmented reality applications can be employed on one or more mobile devices. These applications often utilize range information between the one or more participating mobile devices for exchanging information depending on the distance between the devices.

The mobile devices can include internal clocks for determining the time. However, each of the mobile devices internal clocks can drift relative to one another over time, resulting in errors in calculating the range between the devices. Ranging techniques using multiple mobile devices communicating in the same bandwidth can result in collisions between the data packets. The collisions can result in missed or inaccurate ranging measurements. It can been advantageous for a technique to allow account for these potential collisions in implementing techniques for efficient ranging techniques between the mobile devices.

BRIEF SUMMARY

Certain embodiments are directed to techniques (e.g., a device, a method, a memory or non-transitory computer readable medium storing code or instructions executable by one or more processors) for many to many ranging techniques.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

One of the challenges associated with ranging techniques between mobile devices is clock synchronization between the devices. If the clocks for all the devices were precisely synchronized, a device need only send a message containing time information when the message was transmitted. Other mobile devices that receive this message, could use the transmission time information and the time of reception information to calculate a distance between the receiving device and the transmitting device. However, the mobile devices may not have synchronized clocks at the time of transmission from the transmitting device may not represent the same time for each device. Further, the lack of synchronization may result in devices conducting ranging operations during the same time periods. As these ranging operations often occur on the same wireless channel, collisions can occur between ranging and acknowledgement messages. These missed messages can result in inaccurate ranging messages. Techniques to minimize these collisions in ranging events between mobile devices are disclosed herein.

Techniques can be implemented to reduce the number of collisions between ranging message by designating time slots for ranging sessions based on timing from a coordinator mobile device. Each device can transmit their unique identifier to indicate participation in the ranging session. The multiple devices can receive unique identifiers from the other devices. An algorithm can be executed on the mobile devices using the unique identifiers to designate one of the multiple devices as the coordinator device for the ranging session. The coordinator device can generate and broadcast an active participant list. The active participant list provides a list of unique identifiers and index positions assigned to the mobile devices. The coordinator can determine a table for a ranging session that specifies pairs of mobile devices designated to perform a ranging operation with each other during a particular time period using a particular communication channel. Each of the mobile devices can perform a ranging operation at the particular communication channel as designated in the table.

A second technique can be used to conduct ranging between multiple devices. The second technique can employ a pre-coded ordering to determine the timeslot, preamble, and ranging schedule for the participating mobile devices. The pre-coded ordering can be stored on all participating mobile devices. In the second technique, each device can transmit a greetings message to inform the other devices that the device is participating in the ranging session. Each device can use the pre-coded ordering and the information concerning the participating mobile devices. One of the participating mobile devices can be designated as the coordinator device. The coordinator device can transmit a start message at a start time.

Upon receipt of the start message, the coordinator device and other mobile devices can conduct ranging in accordance with the pre-coded ordering. Following the start message, each device can technique can utilize listening windows during which the devices expect to receive ranging messages from the other devices. Each listening window can account for uncertainty due to inaccuracies in the system. Once the ranging order between the devices is determined, the ranging between the devices can be conducted in order with predetermined delays between ranging between the devices. The ranging session can be repeated multiple times as required by the application using the ranging information. The ranging techniques can be used to share information between devices with a predefined distance for applications such as augmented reality.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 8 illustrates a first exemplary table for the ordering of pairs of mobile devices to conduct a ranging session.

FIG. 9 illustrates a second exemplary table for the ordering of pairs of mobile devices to conduct a ranging session.

FIG. 10 illustrates a third exemplary table for the ordering of pairs of mobile devices to conduct a ranging session.

FIG. 12 illustrates a fourth exemplary table for the ordering of pairs of mobile devices to conduct a ranging session.

FIG. 13 illustrates a fifth exemplary table for the ordering of pairs of mobile devices to conduct a ranging session.

DETAILED DESCRIPTION

Figure 1:
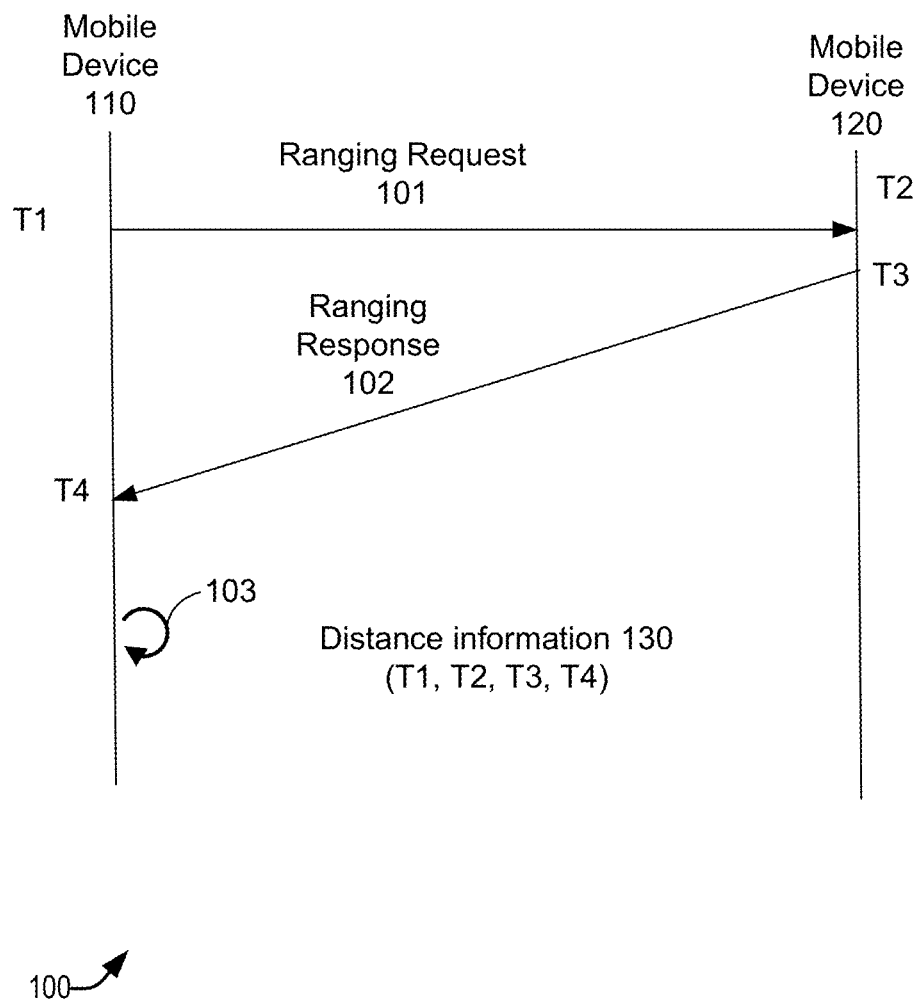
FIG. 1 shows a sequence diagram for performing a ranging measurement between two mobile devices according to embodiments of the present disclosure.

Certain embodiments are directed to techniques (e.g., a device, a method, a memory or non-transitory computer readable medium storing code or instructions executable by one or more processors) for one to many ranging techniques.

Mobile devices may use GPS or other location circuitry to determine the location of the mobile device. For example, a map application can show an approximate location of the mobile device on a map. But, such techniques for determining location are typically determined relative to some external reference frame that is fixed, and not to a variable reference frame, e.g., another mobile device.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

Ranging techniques between mobile devices face challenges due to synchronization of the clocks between devices and collisions between messages on the same channel. Techniques can be implemented to reduce the number of collisions between ranging messages by generating an active participant list and a table to coordinate ranging between the devices. Procedures can be established when new devices enter and leave the ranging session. Procedures can also be established to select a coordinator of the mobile devices for the ranging session. Each of the devices can conduct ranging session with another devices as provided for in the table.

Many to many ranging techniques can be implemented to reduce the number of collisions between ranging message by designating time slots for ranging sessions based on timing from a coordinator mobile device. In a channel splitting technique the ranging time can be divided into numerous discrete time periods. An active participant list can be generated to determine the identifier of each of the participating mobile devices. Each participating mobile device can be scheduled to conduct ranging with each of the other participating mobile devices. A table can be generated that determines the pairings between the mobile devices, the designated times each pair will conduct ranging and the channels the ranging will be conducted on to avoid missed messages dues to data collisions.

In a second time-addition technique predetermined delays can be added between ranging operations between the mobile devices to prevent missed messages due to data collisions. The second technique can employ a pre-coded ordering to determine the timeslot, preamble, and ranging schedule for the participating mobile devices. The pre-coded ordering can be stored on all participating mobile devices. In the second technique, each device can transmit a greetings message to inform the other devices that the device is participating in the ranging session. Each device can use the pre-coded ordering and the information concerning the participating mobile devices. One of the participating mobile devices can be designated as the coordinator device. The coordinator device can transmit a start message at a start time.

Upon receipt of the start message, the coordinator device and other mobile devices can conduct ranging in accordance with the pre-coded ordering. Following the start message, each device can technique can utilize listening windows during which the devices expect to receive ranging messages from the other devices. Each listening window can account for uncertainty due to inaccuracies in the system. Once the ranging order between the devices is determined, the ranging between the devices can be conducted in order with predetermined delays between ranging between the devices. The ranging session can be repeated multiple times as required by the application using the ranging information.

The ranging techniques can be used to share information between devices with a predefined distance for applications such as augmented reality.

A technique allow for splitting up channels at different time amount different pairs of devices. The technique conducts ranging between participating devices in a predefined order at predefined times. In some embodiments, the ranging techniques can use multiple protocols. For example, an authentication and setup phase can be implemented using a first wireless protocol (e.g., BLE or other Bluetooth). A second (ranging) wireless protocol can be used to perform ranging measurements. The ranging techniques can be used to share information between devices with a predefined distance for applications such as augmented reality. This disclosure also provides details regarding the mobile devices that perform ranging techniques.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

I. Ranging

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna. FIG. 1 illustrates a message sequence of a single sided two way ranging protocol. The techniques presented in this application are also applicable to other ranging protocols such as double-side two way ranging.

Mobile device 110 (e.g., a smartphone) can initiate a ranging measurement (operation) by transmitting a ranging request 101 to a mobile device 120. Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, mobile device 110 transmits ranging request 101. At T2, mobile device 120 receives ranging request 101. T2 can be an average received time when multiple pulses are in the first set. Mobile device 120 can be expecting ranging request 101 within a time window based on previous communications, e.g., using another wireless protocol. The ranging wireless protocol and the another wireless protocol can be synchronized so that mobile device 120 can turn on the ranging antenna(s) and associated circuitry for a specified time window, as opposed to leaving them on for an entire ranging session.

In response to receiving the ranging request 101, mobile device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that mobile device 110 can compute distance information. As an alternative, a delta between the two times (e.g., T3-T2) can be sent.

At T4, mobile device 110 can receive ranging response 102. Like the other times, T4 can be a single time value or a set of time values.

At 103, mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2-T1+T4-T3. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional position can be specified in various coordinates, e.g., Cartesian or polar, where polar coordinates can comprise an angular value and a radial value.

Figure 2:
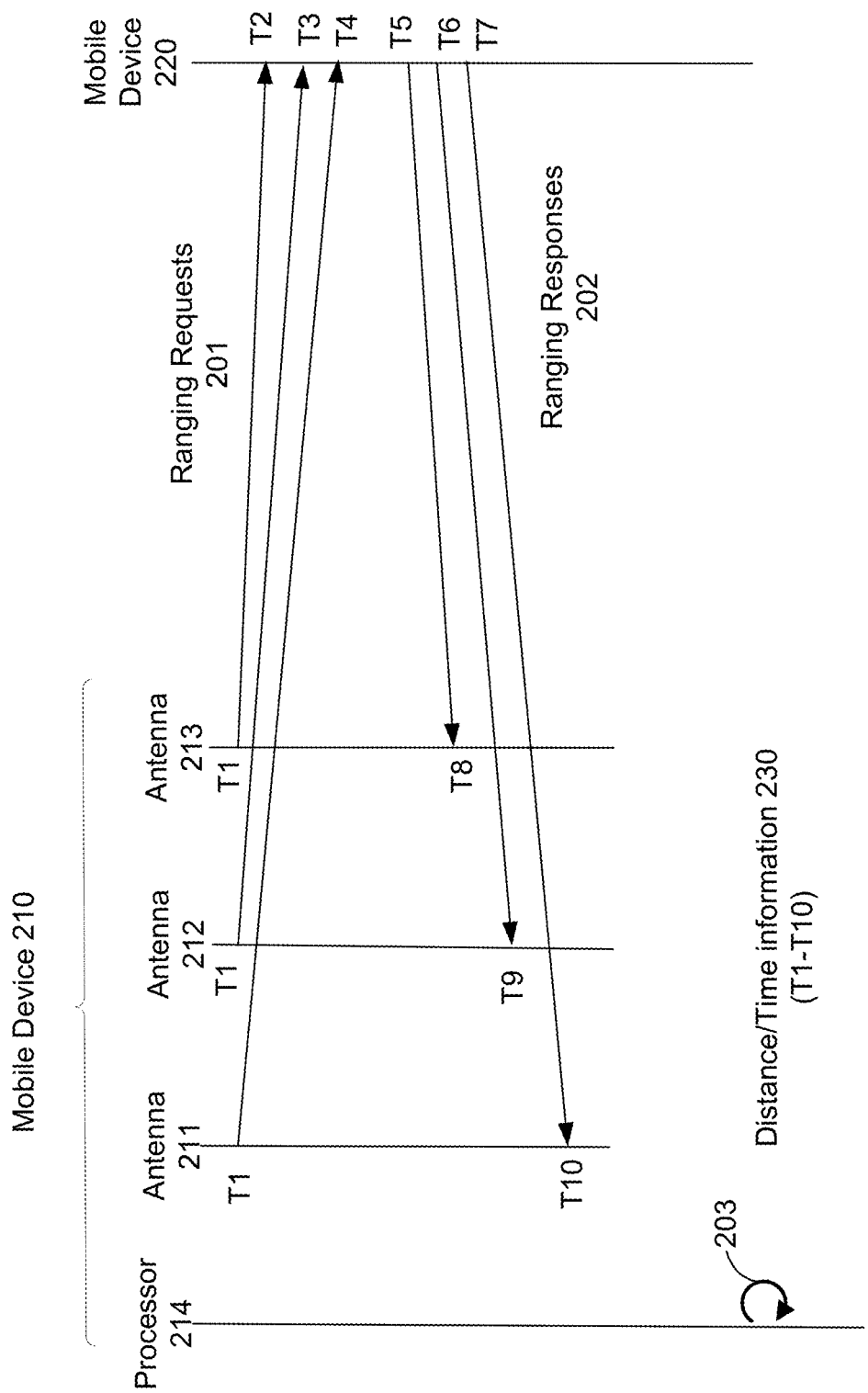
FIG. 2 shows a sequence diagram of a ranging operation involving a mobile device having three antennas according to embodiments of the present disclosure.

FIG. 2 shows a sequence diagram of a ranging operation involving a mobile device 210 having three antennas 211-213 according to embodiments of the present disclosure. Antennas 211-213 can be arranged to have different orientations, e.g., to define a field of view for performing ranging measurements. FIG. 2 illustrates a message sequence of a single sided two way ranging protocol. The techniques presented in this application are also applicable to other ranging protocols such as double-side two way ranging.

In this example of FIG. 2, each of antennas 211-213 transmits a packet (including one or more pulses) that is received by mobile device 220. These packets can be part of ranging requests 201. The packets can each be transmitted at time T1, although they can be transmitted at different times in other implementations.

In some embodiments, mobile device 220 can have multiple antennas itself. In such an implementation, an antenna of mobile device 210 can send a packet to a particular antenna (as opposed to a broadcast) of mobile device 220, which can respond to that particular packet. Mobile device 220 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 201 are received at times T2, T3, and T4, respectively. Thus, the antenna(s) (e.g., UWB antennas) of mobile device 220 can listen at substantially the same time and respond independently. Mobile device 220 provides ranging responses 202, which are sent at times T5, T6, and T7, respectively. Mobile device 210 receives the ranging responses at times T8, T9, and T10, respectively.

At 203, processor 214 of mobile device 210 computes distance information 230, e.g., as described herein. Processor 214 can receive the times from the antennas, and more specifically from circuitry (e.g., UWB circuitry) that analyzes signals from antennas 211-213. As described later, processor 214 can be an always-on-processor that uses less power than an application processor that can perform more general functionality. Distance information 230 can be used to determine a 2D or 3D position of mobile device 220, where such position can be used to configure a display screen of mobile device 210. For instance, the position can be used to determine where to display an icon corresponding to mobile device 220, e.g., which position in a list, which position in a 2D grid, or in which cluster of 1D, 2D, or 3D distance/position ranges to display the icon.

In some embodiments, to determine which ranging response is from which antenna, mobile device 220 can inform mobile device 210 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 201 and ranging responses 202 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over 1 millisecond). The packet frames in these messages can be on the order of 150 to 180 microseconds long.

C. Ultra-Wide Band (UWB)

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 megahertz (MHz)), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a MAC layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 201 can correspond to stage 1 and ranging responses 202 can correspond to stage 2. Such use of an indicator may be helpful when more than two devices are performing ranging operations in near each other.

The narrow pulses (e.g., one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging wave form of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

II. Many to Many Scenario

For certain applications, e.g., augmented reality, for multiple mobile devices to conduct ranging with each other. Techniques can be implements to overcome the challenges due to mobile device clock drift. A single mobile device of the multiple mobile devices can function as a coordinator that can drive the other ranging exchanges between the other devices. These techniques can minimize the overlapping communications that can occur due to clock drift or other synchronization issues.

Figure 3:
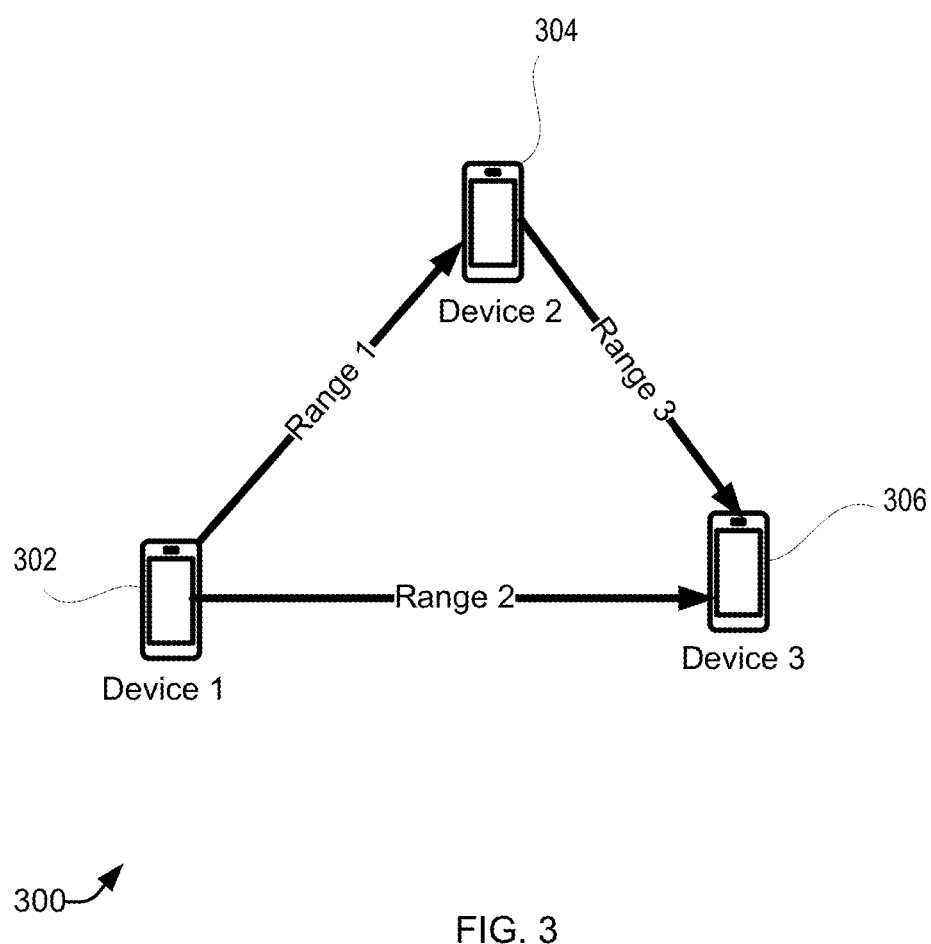
FIG. 3 illustrates schematically an example of many-to-many ranging techniques involving a multiple devices.

FIG. 3 illustrates a many-to-many communication group involving three mobile devices (device 302, device 304, and device 306). Although three mobile devices are depicted in FIG. 3, these techniques can occur with many mobile devices. Any of mobile devices 302, 304, and 306 can be designated as the coordinator for a ranging session. Methods for determining the ranging coordinator are discussed below. The mobile device can be a smartphone, a tablet, or other mobile electronic device. The mobile devices can be from any number of different manufacturers, types or models of devices. Each mobile device can include a unique identification number. In some embodiments, the unique identification number can be a universally unique identifier (UUID). A UUID can be a 128-bit number used to identify information in computer systems. The UUID can be randomly generated and individually assigned to the mobile device hardware by the manufacturer.

A. Clock Drift

Figure 4:
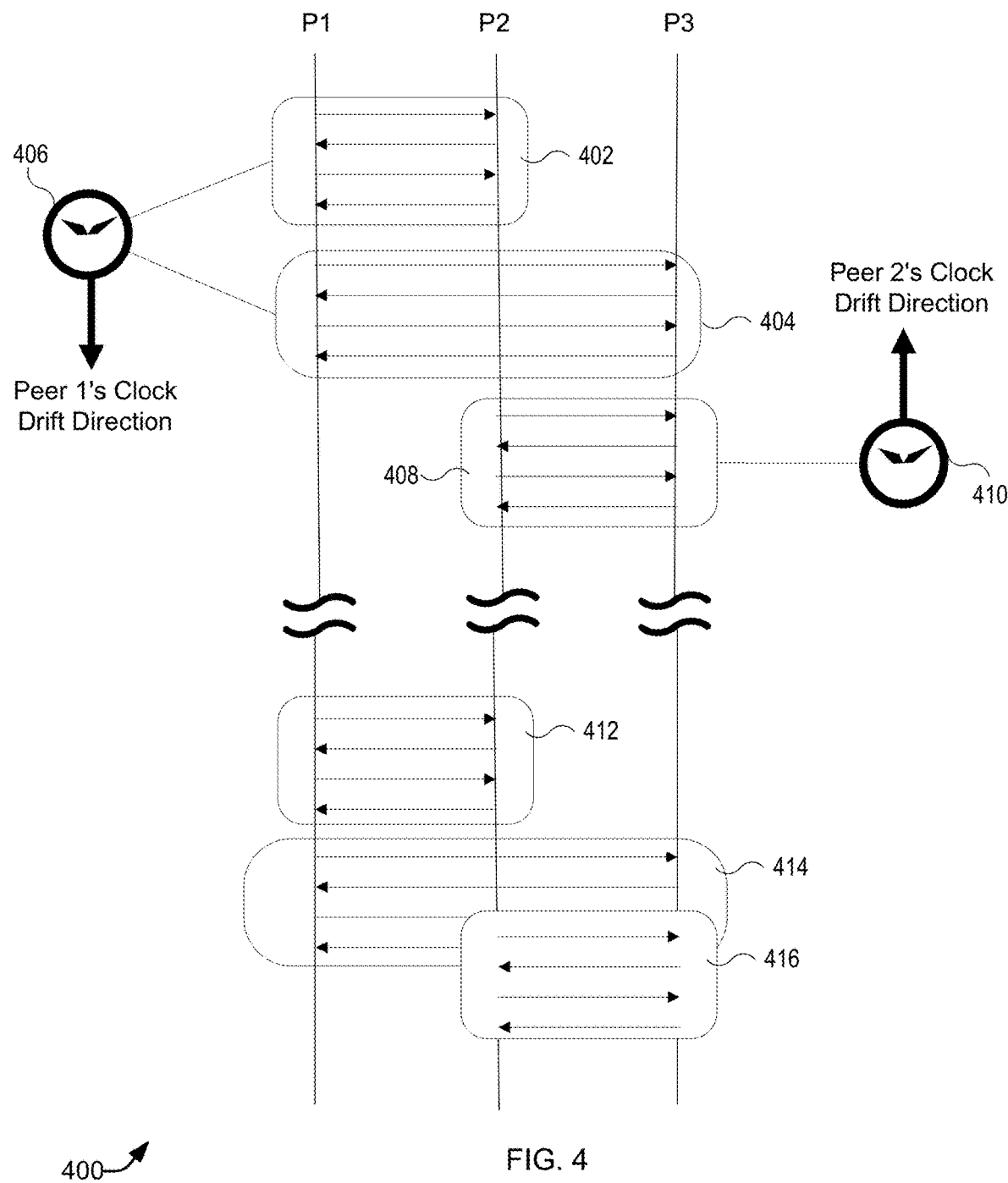
FIG. 4 illustrates an exemplary time sequence of ranging events between mobile devices demonstrating clock drift.

FIG. 4 shows an exemplary time sequence of ranging events between mobile devices illustrating clock drift. FIG. 4 illustrates three mobile devices (labelled P1, P2, and P3). In the example illustrated in FIG. 4 all devices must range to each other. The first mobile device (P1) conducts ranging with the second mobile device (P2). FIG. 4 illustrates a first ranging operation 402 between the first mobile device and the second mobile device. In some embodiments, the first ranging operation includes a ranging message transmitted from the first mobile device. Upon receipt of the first ranging message, the second mobile device can transmit a response message to the first mobile device. The distance between the first mobile device and the second mobile device can be determined by calculating the round trip time between the transmission of the first ranging message and the receipt of the first acknowledgement message, subtracting any processing delays. In some embodiments, a ranging operation may have more than one exchange of messages between the first mobile device and the second mobile device. Multiple message exchanges allows for distance determination, even if one of the messages is missed. For example, in the first ranging operation 402 illustrates two ranging messages and two response messages.

Following completion of the first ranging operation 402, the first mobile device can begin a second ranging operation 404 between the first mobile device P1 and the third mobile device P4. In the second ranging operation 404 the first mobile device can send a ranging message from the first mobile device for the third mobile device. Upon receipt and processing, the third mobile device can transmit a response message to the first mobile device. The distance between the first mobile device and the third mobile device can be determined by calculated the round trip time between the transmission of the second ranging message and the receipt of the second acknowledgement message, subtracting any processing delays. In some embodiments, a ranging operation may have more than one exchange of messages between the first mobile device and the third mobile device. Multiple message exchanges allows for range determination, even if one of the messages is missed. For example, in the second ranging operation 404 illustrates two ranging messages and two response messages.

FIG. 4 illustrates that the timing of the first ranging operation 402 and the second ranging operation 404 can be based on the timing clock of the first mobile device. In the example illustrated in FIG. 4, the time of the first clock 406 can drift forward as time progresses.

Following completion of the second ranging operation 404, the second mobile device can begin a third ranging operation 408 In the third ranging operation 408 the second mobile device can send a ranging message from the second mobile device to the third mobile device. The third ranging operation 408 can be based on the time of the second clock 410 of the second mobile device. As show in FIG. 4, as time progresses the second clock can drift backward as time progresses.

Upon receipt and processing, the third mobile device can transmit a response message to the second mobile device. The range between the second mobile device and the third mobile device can be determined by calculated the round trip time between the transmission of the third ranging message and the receipt of the third acknowledgement message, subtracting any processing delays. In some embodiments, a ranging operation may have more than one exchange of messages between the second mobile device and the third mobile device. Multiple message exchanges allows for range determination, even if one of the messages is missed. For example, in the third ranging operation 408 illustrates two ranging messages and two response messages.

The ranging round between the first, second, and third devices can repeat multiple times as needed by the application. Over time, the forward drift of the first clock 406 of the first mobile device will interfere with the backward drift of the second clock 410 of the second mobile device. For example, a fourth ranging operation 412, can be conducted between the first mobile device and the second mobile device. A fifth ranging operation 414 can be conducted between the first mobile device and the third mobile device. A sixth ranging operation 418 can be conducted between the second mobile device and the third mobile device. As illustrated in FIG. 4, the fifth ranging operation 414 can overlap in time with the sixth ranging operation 416. As the communications occur in the same frequency band this operation can result in missed messages and inaccurate ranging results. For example, the acknowledgement messages from the third mobile device intended for the second mobile device may be received by the first mobile device. Also collisions between the request and response messages in the same frequency band may result in missed messages.

B. Guard Time Ranging Techniques

Figure 5:
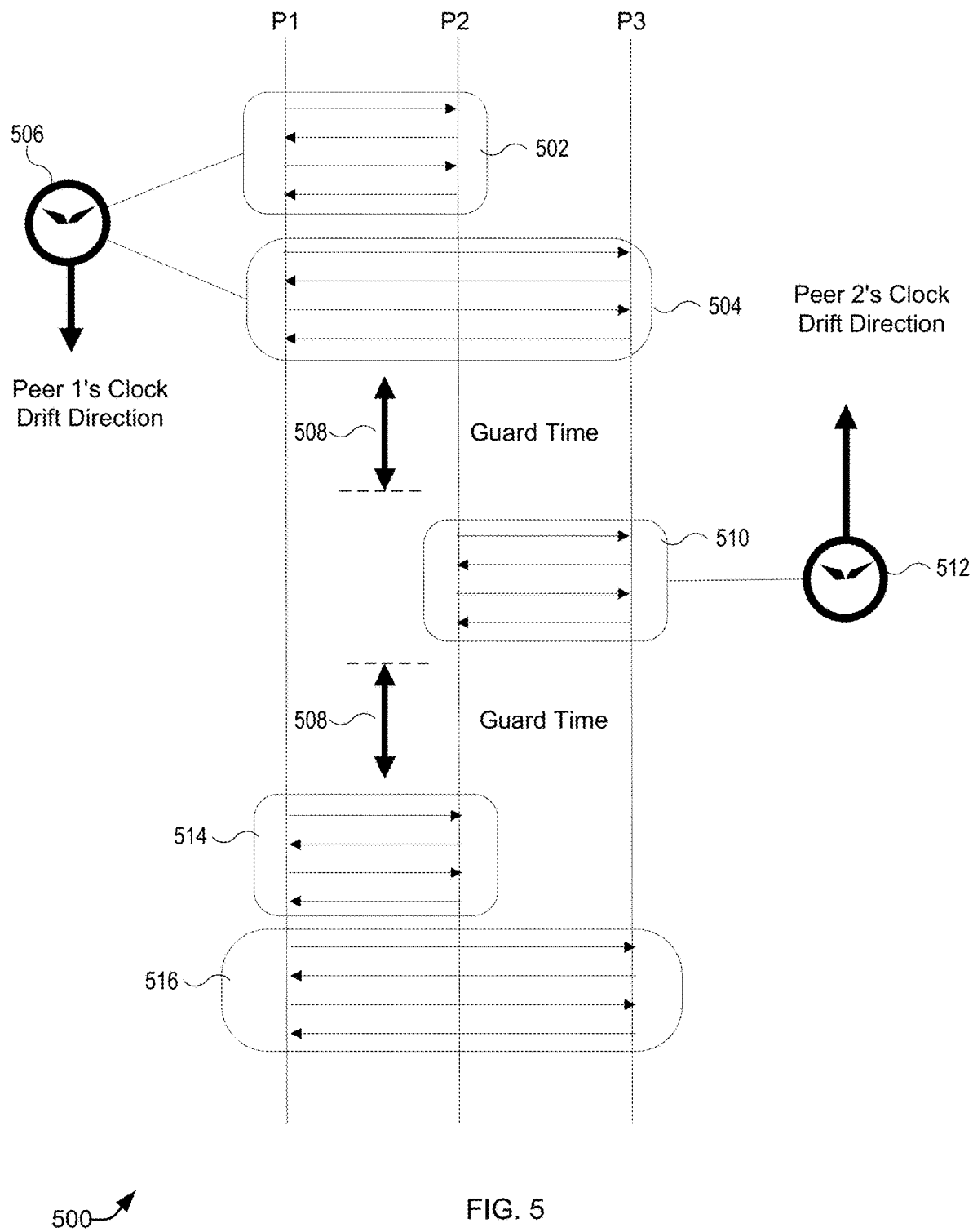
FIG. 5 illustrates an exemplary time sequence of ranging events between mobile devices demonstrating guard time.

FIG. 5 illustrates an exemplary time sequence of ranging events between mobile devices demonstrating guard time. Similar to FIG. 4, the technique illustrated in FIG. 5 shows three mobile devices (P1, P2, and P3). The first ranging operation 502 and the second ranging operation 504 are similar to the ranging operations illustrated in FIG. 4. The fourth ranging operation 514 and the fifth ranging operation 516 differ from FIG. 4 as there is no longer overlap due to clock drift between the first clock 506 and the second clock 512.

The first ranging operation 502 and second ranging operations 504 are based on time from the first clock 506. The third ranging operation 510 between the second and third devices is based on the second clock 512. However, in FIG. 5, a predetermined period of time or guard time 508 can be introduced between the second ranging operation 504 and the third ranging operation. In some embodiments a guard time 508 can also be introduced between ranging sessions. The introduction of guard time 508 can alleviate overlap between ranging operations and minimize missed ranging messages. The guard time 508 can be a preset time operation based on the application. In some embodiments, the guard time 508 can be dynamically adjusted as needed based on clock drift between the devices. The introduction of guard time 508 can be wasteful, as the inefficiency of the ranging technique can increase as more devices are introduced, requiring additional guard times.

The mobile devices (P1, P2, P3) can detect missed ranging and response messages when devices fail to receive messages during time scheduled time periods. The guard time 508 can be adjusted dynamically depending on the number of missed messages. A problem can arise from needing to make the guard time 508 sufficiently long that over the period of the entire ranging session, which can be minutes or even hours, the clock drift will not be large enough that the ranging intervals will drift into each other. As the number of devices increases, it would be difficult to have a guard time 508 that would work effectively. Guard time 508 would add latencies to the system eliminating the use of ranging in many real-time or near real-time applications. Therefore, other techniques can be employed to overcome the synchronization and timing issues without employing guard time techniques. Such techniques include channel splitting and time-addition ranging techniques described below.

C. Coordinator Synchronized Ranging Techniques

An improved approach for conducting many to many ranging involves the synchronization of all ranging exchanges to a clock of one mobile device designated as the coordinator. The clock of the coordinator drives all ranging exchanges instead of relying on the internal clocks of the other mobile devices. Instead of using an internal clock to set the time of other exchanges between the mobile devices, the other devices can employ a ranging schedule to listen for other exchanges to complete before initiating other ranging sessions. Thereby reducing the number of missed messages caused by collisions between messages. A basic illustration of this technique can be seen in FIG. 6.

Figure 6:
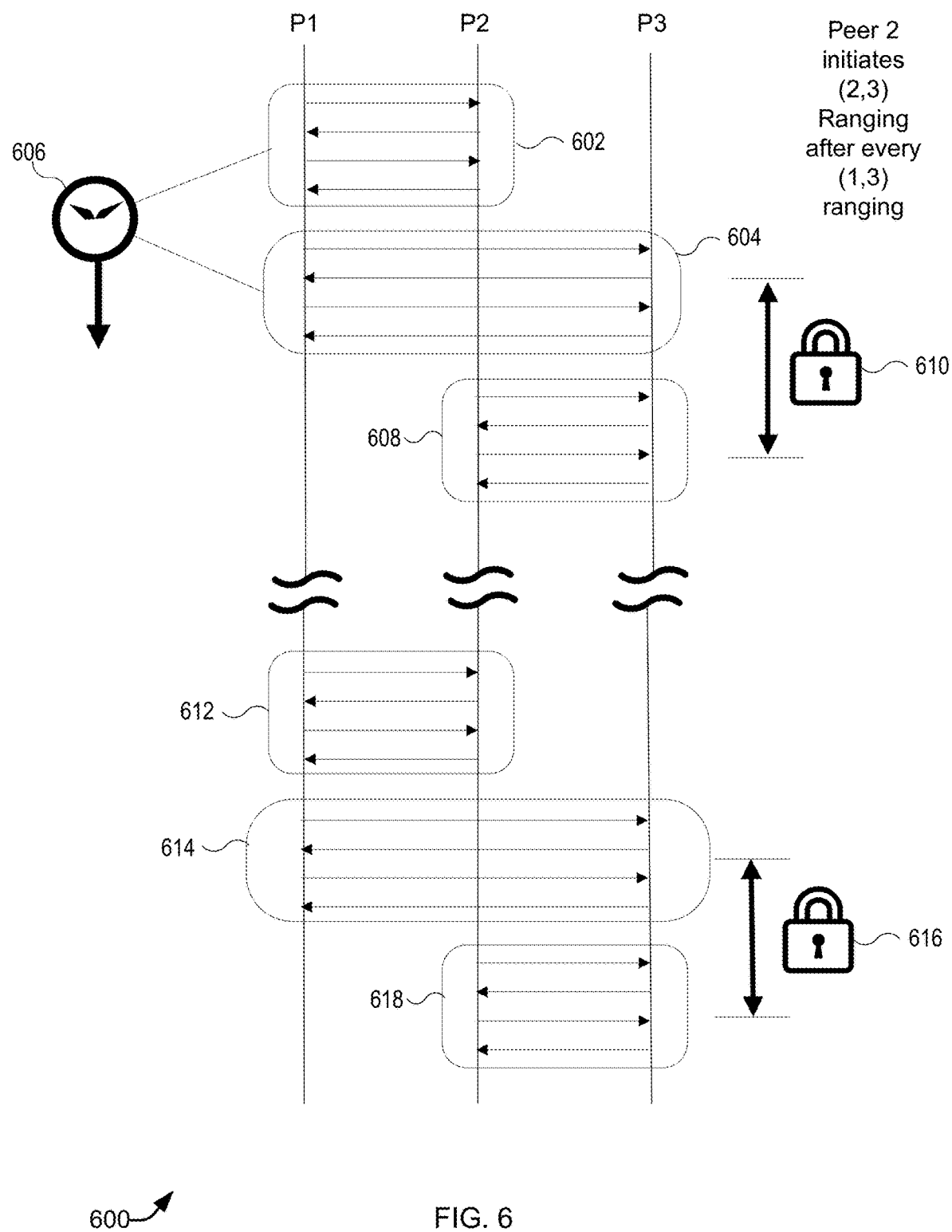
FIG. 6 illustrates an exemplary time sequence of ranging events between mobile devices demonstrating the allocation of time to overcome synchronization issues.

FIG. 6 illustrates an exemplary time sequence 600 of ranging events between mobile devices demonstrating an improved approach to overcome synchronization issues. Similar to FIG. 4 and FIG. 5, the ranging technique illustrated in FIG. 6 also shows three mobile devices (P1, P2, and P3). The first ranging operation 602 and the second ranging operation 604 are similar to the ranging operations illustrated in FIGS. 4 and 5. However, in FIG. 6, the ranging operations are synchronized to the clock of one device. In FIG. 6, the ranging session is synchronized with the first clock 606 for the first mobile device. In FIG. 6, the second mobile device P2 no longer relies solely on its internal clock to set the timing of the third ranging operation between the second mobile device and the third mobile device. In the technique illustrated in FIG. 6, the second device waits for the exchange between the first device and the third device to complete before initiating the ranging operation between the second and third devices. A first delay time 610 is used between the second ranging operation 604 and the third ranging operation 608. The first delay time 610 can be based on the first clock 606.

In this improved method, FIG. 6 illustrates that even after a prolonged time or number of ranging cycles, despite the first clock 606 draft the later ranging operations do not overlap. For example, a fourth ranging operation 612 can occur between a first device and a second device. A fifth ranging operation 614 can occur between a first device and a third device. A second delay time 616 can occur after the second ranging operation after the second device detects completion of the fifth ranging operation. The second delay time 616 can be equal to the first delay time. A sixth ranging operation 618 can occur between the second device and the third device. As shown, the sixth ranging operation 618 no longer occurs during the same time period as the fifth ranging operation 614. Therefore, this technique reduces the number of missed messages due to collisions between the messages.

For the techniques illustrated in FIG. 6, a side channel (e.g., Wi-Fi/Bluetooth) with finite latency and guaranteed delivery should exist for communication between the participants. A side channel can be any communication channel that is incidental to another communication channel. The participating mobile devices can be identified by a unique identifier (e.g., a UUID). In some embodiments, the unique identifier can be used to determine the order for ranging techniques. For example, the UUID's numerical order can be used to resolve conflicts between participants. In some embodiments, the least significant 8 bytes of the UUID can be used as media access control addresses (MAC) addresses. UWB packets can include destination and source MAC addresses. In some embodiments, the mobile devices can periodically broadcast a message on a side channel indicating their continued presence in the ranging session.

Such a many to many scenario can occur when a group of devices implement coordinated augmented reality. Augmented reality (AR) can present data, images, and text overlays for a view of the real world. Mobile devices can use employ augmented reality techniques by adding data about the devices location, orientation, other users in the vicinity, to views through the device's camera. Previous techniques may have used the navigation features of the mobile device to map the location. However, in cases with many devices located in close proximity (e.g., a classroom) the GPS data alone is not sufficient to provide range between each of the mobile devices. GPS accuracy level can be between 100 to 250 feet.

Many to many ranging techniques can provide the accuracy that GPS alone does not. For example, if a teacher wants to provide information to certain groups of students closest to each other for example to form teams for a classroom exercise. Many to many ranging techniques can be used for the devices to conduct ranging with each other. This ranging information can be used to generate an AR overlay of the classroom showing the location of all the devices relative to each other. The teacher can use the AR overlay to form groups of students nearest each other. The AR applications can also be used for gaming, locating of team members in a crowded venue, virtual tourism, and training systems.

III. Channel Splitting Techniques

In a channel splitting technique the ranging session can be divided up into a number of channels. A ranging schedule can be generated based on the number of devices and the number of channels available to conduct ranging. The number of channels can be based in part on the number of preambles and the number of packet positions within each timeslot. The generated schedule can be transmitted to all the devices active in the ranging session. Each device can reference the generated schedule to know their assigned time slot for ranging and which device they can be ranging with during that time slot.

A. Active Participant List

An active participant list (APL) can list the devices that are currently participating in a many to many ranging session. Such a list can be used to coordinate when ranging occurs between pairs of devices so that there are no collisions.

Figure 7:
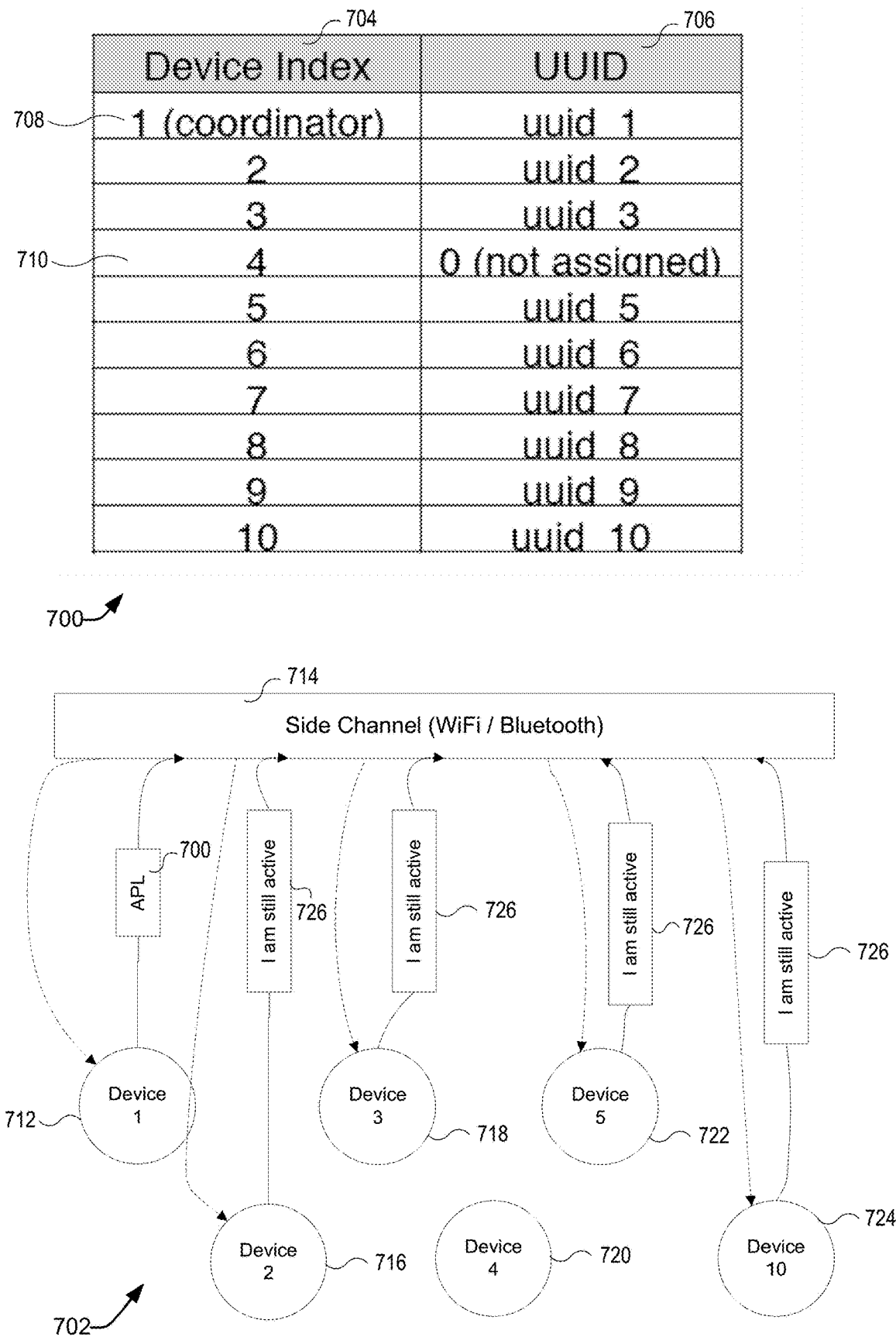
FIG. 7 illustrates an exemplary active participation list and an exemplary communication exchange.

FIG. 7 shows an active participant list (APL) that can be used in some embodiments. In the ranging techniques illustrated in FIG. 7, one participant mobile device can assume the role of coordinator (e.g., labelled Device 1) and the other devices can be called follower devices. The coordinator can periodically broadcast the APL over the side channel. The active participant list (APL) can be a list of all UUIDs that are actively participants in the ranging session.

In certain embodiments, of the first two participating devices joining a ranging session, the participating device with a lower UUID can adopt the role of coordinator (Device 1) and the other device shall become a follower (Device 2). In other embodiments, the device with the higher UUID can adopt the role of coordinator. In other embodiments, the range information can inform the role of coordinate. For example, the device with the lowest average range to the other participating devices (i.e., the device most central to the group of devices) can be designated as the coordinator. Other, more complex algorithms for selecting the coordinator can be implemented.

Only the coordinator can add or remove devices from the ranging session. The coordinator device can add or remove participating devices by adding or removing unique identifiers (e.g., UUID) from the APL. The coordinator can assign the new device a position in the sequence and a designated pairing with other devices for ranging operations.

If multiple participating devices claim the role as coordinator, the device with the lower unique identifier (e.g., UUID) shall be designated as the coordinator. The other device shall be designated as a follower device.

FIG. 7 illustrates an exemplary active participant list (APL) 700 and an exemplary communication exchange 702. The APL 700 can provide a device index 704 and a unique identifier 706 (e.g., a UUID). In the exemplary APL 700 up to ten (10) participating mobile devices can be active in a ranging session at one time. In FIG. 7, there are nine participating devices. Device index-1 708 (uuid 1) is identified as the coordinator for the ranging session. Device index-4 710 is identified as not being assigned to a unique identifier. This can be an indication the device that previously was assigned to index-4 710 has left the ranging session or is out of range. Another new device seeking to enter the ranging session can be assigned to device index-4 710. All participating devices can refer to the coordinator's APL 700 to determine which device index 704 corresponds to which unique identifier 706 (e.g., UUID). The APL 700 can include a list of device index 704 slots for the participating devices. Each of devices 1-3 and 5-9 are assigned a device index 704. The device index 704 can determine the ranging order for the participating devices.

FIG. 7 illustrates an exemplary communication exchange 702 between multiple devices over a side channel 714 (e.g., Wi-Fi/Bluetooth). The communication exchange 702 includes Device-1 712, Device-2 716, Device-3 718, Device-5 722 and Device-10 724. Device-4 720 is not participating in the communication exchange 702. Device-1 712 transmits the APL 700 over the side channel 714. Each of the participating devices can receive the APL 700 and respond with a response message 726 indicating the device is still active in the ranging session.

The Device-1 712 as the coordinator device can receive the response messages 726 and update the APL 700 so it represents the participating devices. As Device-4 720 did not transmit a response message 726, Device-1 712 would not include Device-4 720 in the APL 700. If a new device, not shown, transmitted a response message 726, then Device-1 712 could update the APL 700 to include the new device. In some embodiments, all the devices can receive the response message 726 and update an APL 700 stored in a memory of the device.

The failure of the coordinator device to transmit an APL 700 after a predetermined amount of time can be an indication the coordinator device, here Device-1 712, has left the ranging session. Routines can be executed to select a new coordinator device from among the other participating devices. If a new coordinator is selected, and Device-1 712 returns to the ranging session, it will participate as a participating device. In some embodiments, if Device-1 712 returns to the ranging session, a routine can be determined to see whether Device-1 712 will retake the role as coordinator.

B. Follower Devices Entering and Leaving Ranging Session

In various embodiments, a new mobile device can enter the ranging session by broadcasting a message on a side channel 714 to indicate its presence in the vicinity of the coordinating device. Upon receipt of the new device message, including a unique identifier of the new device (e.g., a UUID) the coordinator can add the new participant's unique identifier to the APL 700, assigning the new device and unique identifier to an open device index 704 slot. The coordinator device can then broadcast an updated APL 700 including the new device. Upon receiving the updated APL 700, the new participating device can participate in the ranging session.

If a device other than the coordinator device (as known as a follower device) drops out of range or leaves the ranging session, the coordinator device can detect that the follower ceased broadcasting messages on the side channel. After missing a certain number of broadcast messages from a follower device, the coordinator device can un-assign the follower universally unique identifier 706 (e.g., UUID) from the APL 700. The updated APL 700 can be transmitted to the remaining follower devices. The follower device that is out of range or leaving the ranging session will not be included in subsequent ranging sessions.

The departure of the coordinator device can be detected by the follower devices after some period of time of not receiving the APL 700 from the coordinator device. If the coordinator device is dropping or leaving the ranging session, the follower devices can implement a priority routine (e.g., lowest unique identifier (e.g., UUID), lowest average range between devices) to determine the new coordinator. The new coordinator will update and broadcast a revised APL 700 to the participating devices. If the previous coordinator returns back within range or rejoins the ranging session, the previous coordinator will prevail as coordinator as determined by the priority routine (e.g., lowest unique identifier (e.g., UUID), or lower average range between devices). The previous coordinator can also return as a follower device and be added to the APL 700 by the new coordinator.

C. UWB Channelization

A channel can be a communication exchange protocol between two mobile devices. A channel be comprised of a preamble and a position within a packet. A preamble can be an alpha-numeric sequence incorporated into the message. The preamble can be incorporated into the beginning of the message. The preamble can be unique to a mobile device, therefore the preamble can be used to determine if the message is intended to be part of the ranging session. For example, if device-1 is ranging with device-2, device-2 can look to receive ranging messages that include the preamble for device-1. Device-2 can ignore ranging messages that do not include the preamble for device-1. Alternatively, the preamble could specify device-2, or any other mutually agreed code that provides the indication of the channel being used. Therefore, several mobile devices can conduct simultaneous ranging sessions using different preambles. Each ranging pair can look for certain preambles and ignore the other messages with different preambles. In this way, the number of channels can be increased as a factor of the number of preambles.

A ranging cycle can be divided into multiple time slots, each time slot a discrete time duration in length. The time slots may be further subdivided into multiple packet positions. For example, a first time slot can be subdivided into four different packet positions. Each of the four packet positions can be equal in time and represent a different channel for ranging session. For example, during an exemplary timeslot four (4) different pairs of devices can conduct ranging with each other. A second device can conduct ranging with a third device. A fourth device can conduct ranging with a fifth device. A first device can conduct ranging with a tenth device. An eighth device can conduct ranging with a ninth device. Each of these ranging pairs can be considered a different channel. In this way, the number of channels can be increased as a factor of the number of packet positions within a timeslot.

Therefore, the number of channels that can be used for ranging techniques can depend on the number of preambles used and the number of multiple packet positions, or both, for each given timeslot. A coordinator can use the preambles and multiple packet positions to schedule ranging sessions between multiple devices. The number of ranging channels can be determined by the number of preambles available for ranging (Np) multiplied by the number of packet positions with a timeslot (Ns) i.e., floor (Timeslot Duration/Packet Length). Each participating device can act as the coordinator. Therefore, each participating device must know how to assign logical indices 1, 2, ... N to ranging channels.

1. UWB Ranging Schedule (RS) Tables

The technique can schedule pairwise ranging exchanges between the devices. The maximum number of devices that can participate in a ranging session can be represented by the variable K. The maximum number of device pairs (P) that must range to each other over N channels can be calculated with the following formula:

$$P = K*(K-1)/2$$

The ranging schedule (RS) consists of placement of P pairs into a M-by-N table, where M represents the number of rows and N represents the number of columns, such that no device appears more than once per row. Each column of the M-by-N table represents a different channel as described above. Each row of the M-by-N table represents a different time schedule. Serial RS is obtained when N=1 (i.e., a single channel) and RS table is P-by-1 (i.e., M=P). Each device can have an unambiguous way of generating the ranging schedule. An algorithm can be used to independently generate a ranging schedule on each device, or it can be hard coded and tied to MAC version number on each device. In some embodiments, the ranging schedule can be generated by the following process.

A technique for generating a ranging schedule includes ordering the pairs of devices in such a way to avoid any one device from ranging with more than one other device during a given time period. The technique can establish an unambiguous ordering of P pairs. The pairs can be represented as a two number array (I, J) where I represents one device in a ranging session, and J represents a second device in a ranging session.

In one technique the pairs are ordered such that the device index of I is less than the device index of J {(I,J): I<J}. The technique can analyze all the pairs with J−I=1 first, then go through all pairs with J−I=2 ... until J−I=K−1 (i.e., the final pair (1,K)] is listed. For example, a first row of a ranging schedule can be have ranging pairs where the device index of a second device minus the device index of a first device equals one (J−I=1) resulting in a first row of (1,2), (3,4), (5,6), and (7,8). The pair of (2,3) cannot occur in the first row because device two is already ranging with the first device in the first row representing the first time slot. The remaining devices of (4,5), (6,7) and (8,9) continue the pattern of the first row. The pair of (9, 10) cannot occur in the second row because device index nine is already ranging with device index eight. Therefore, the pair (9,10) can occur in the third row.

Having completed all the J−I=1 pairs, the technique then begins to analyze ranging pairs where the device index of a second device minus the device index of a first device equals two (J−I=2) resulting in pairs (2,4), (5,7), (3,5), (4,6), (7,9), (8, 10), and (6,8). These J−I=2 pairs are scheduled such that the devices are not ranging with more than one device in a row/timeslot. For example, the pair (3,5) occurs in the fourth row because device index three is ranging with a first device index in the third row. This process is continued until the final ranging pair (1,K) is scheduled.

Next, a first row of the ranging schedule can be generated. The technique can start with an empty table of N columns (Channel Indices) and write pairs across its first row following the order established above. Any pair that involves a device index already used in the current row of the table is skipped and added to the carry-over (first in, first out) queue.

Next, a second row of the ranging schedule can be generated. The technique can complete the next row of the table by first drawing pairs from the carry-over queue. If a pair cannot be placed on the current row, it is left on the queue and the technique moves to the next pair in the queue. If the technique reaches the end of the carry-over queue the technique will return to where it left off in the original ordered sequence to get the next pair. Additional pairs may be inserted into the carry-over queue.

Finally, the remaining rows are generated until all the P pairs are exhausted and the carry-over queue is empty. In this way, all of the devices have had an opportunity to range with other devices without having any device conduct ranging with more than one device during any timeslot.

FIG. 8 illustrates a first exemplary table 800 for the ordering of pairs of mobile devices to conduct a ranging session for ranging schedule generation. In this example, the maximum number of devices (K) is ten (10) and the number of available channels N is four (4). The four channels depicted in FIG. 8 are Ch-1 802, Ch-2 804, Ch-3 806, and Ch-4 808. In an embodiment, the four channels can be a single preamble using four packet positions per timeslot. The four channels can alternatively be two (2) preambles and two (2) packet positions per ranging operation. In another example, the four channels can be four preambles and one (1) packet position per timeslot. Each device can independently generate this schedule using the algorithm described above.

Each row 810 corresponds to a time period and each column corresponds to a different channel. The pairs listed in each row 810 represents a series of ranging operations between devices. The first number 812 indicates a mobile device initiating a ranging operation with the second mobile device represented by the second number 814. For example, in the third row mobile device 2 conducts a ranging operation with mobile device 3. The number of rows (M), corresponding to the number of time period, for this example is 13. For example, for channel 1, the first device will range with the second device. For channel 2, the third device will range with the fourth device. For channel 3, the fifth device will range with the sixth device. For channel 4, the seventh device will range with the eighth device. An improved scheduling algorithm can modify the ranging schedule generation techniques described above to produce an optimal ranging schedule with a total of twelve (12) rows as depicted in FIG. 9.

FIG. 9 illustrates an exemplary optimized table 900 for ranging schedule generation. In the optimized table depicted in FIG. 9 the technique can achieve a tighter packing of pairs resulting in fewer rows allowing the system to complete the ranging operations in a shorter time period. For example, the first row 910 only includes ranging between device 1 and device 2. Just like the table 800 of FIG. 8, the first number 912 indicates a mobile device initiating a ranging operation with the second mobile device represented by the second number 914. For example, in the second row mobile device 2 conducts a ranging operation with mobile device 3. The optimized table 900 table depict twelves (12) rows which achieves the tightest possible scheduling of 45 pairs across four (4) channels. The four channels depicted in FIG. 9 are Ch-1 902, Ch-2 904, Ch-3 906, and Ch-4 908. The optimization comes from moving the ranging operations for a select number of mobile device pairings, specifically a the pairing (1,10) 916, the pairing (5,6) 918, the pairing (7,8) 920, the pairing (3,4) 922 and the pairing (6,7) 924 into new positions to avoid first devices pairing with more than one second device in any one row.

The table depicted in FIG. 9 can be hard-code and tied to a MAC version number so that future versions could support a larger number of devices possibly over a larger number of channels. The optimized table 900 show in FIG. 9 produces a multi-processing gain (over several scheduling of 45 pairs). In this example, the gain is 45/12 or 3.75.

Increasing the number of channels can only reduce the total ranging time up to a point. FIG. 10 illustrates another exemplary table 1000 for ranging schedule generation. In the table depicted in FIG. 10 the maximum number of devices (K) is ten (10) and the number of channels is six (6). The six channels depicted in FIG. 10 are Ch-1 1002, Ch-2 1004, Ch-3 1006, Ch-4 1008, Ch-5 1010, and Ch-6 1012. The first row 1014 cannot utilize all the channels because the devices are already fully engaged in ranging operations during that time period. Just like the table 800 of FIG. 8, the first number 1016 indicates a mobile device initiating a ranging operation with the second mobile device represented by the second number 1018. Therefore, table 1000 demonstrates that increasing the number of channels beyond five (5) columns/channels cannot help reduce the number of rows in the table because the devices are already fully engaged as in first two rows, or the technique will run out of pairs that fit in subsequent rows. Therefore, optimal packing of 45 pairs into 9 rows may not be possible.

2. Sequence Diagrams for Schedules

Figure 11:
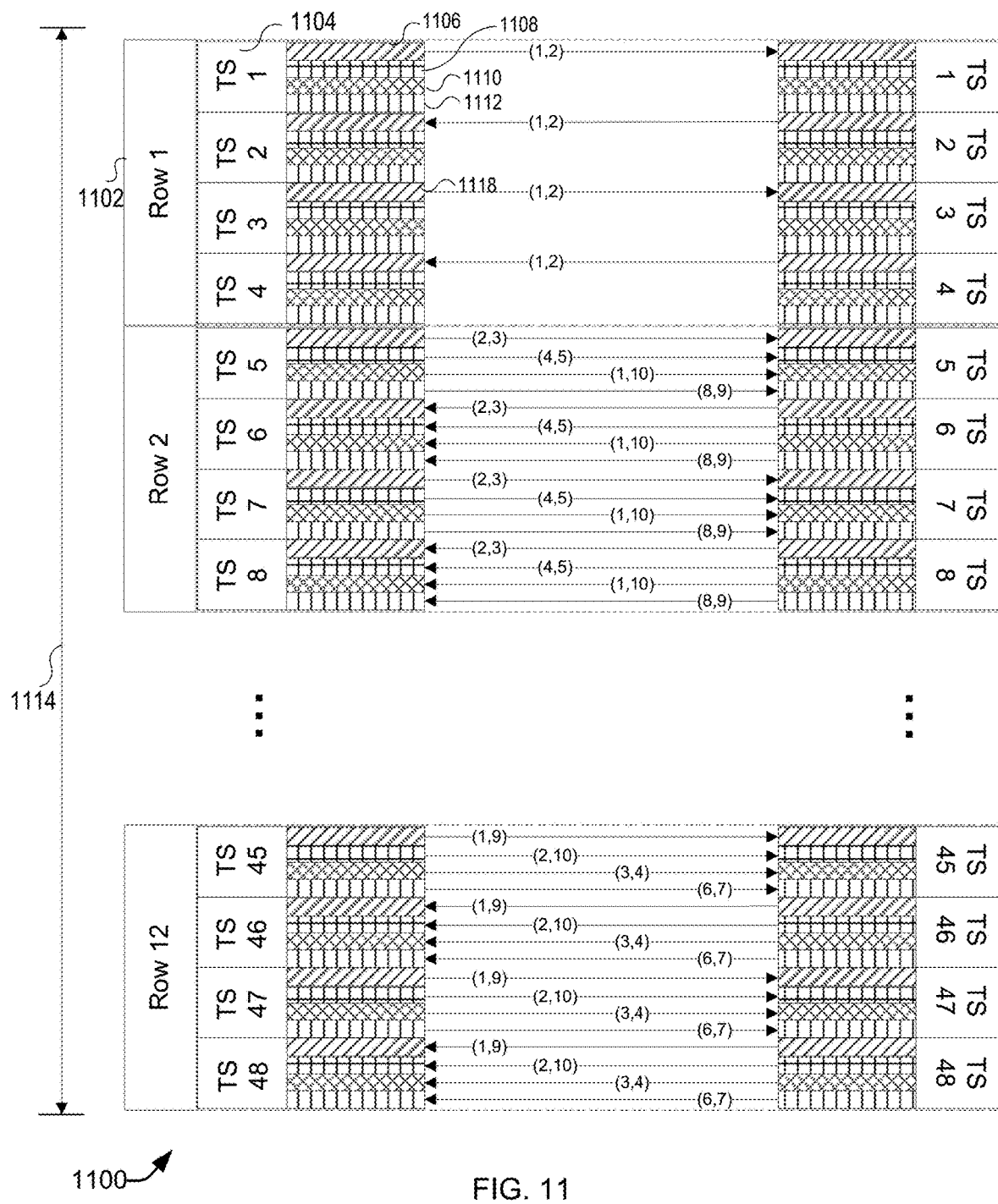
FIG. 11 illustrates an exemplary sequence diagram for a ranging session between mobile devices.

The exemplary optimized table 900 of FIG. 9 can be shown as a portion of an exemplary sequence diagram 1100 as shown in FIG. 11. The entire sequence diagram consists of twelve rows of ranging as shown in table 900 of FIG. 9. Each row can represent a time period or a group of timeslots that can be further subdivided into four packet positions. This this results in a total of 48 discrete periods of time to conduct ranging operations.

FIG. 11 illustrates a portion of an exemplary sequence diagram 1100. In the exemplary sequence diagram 1100, the maximum number of devices (K) is ten (10) and the number of channels is (N) is four (4). In the exemplary sequence diagram 1100, the 4-packet exchanges can provide precise range information at both initiator and responder devices. For example, for the first timeslot 1104, Device 1 is the initiator of the ranging exchange and Device 2 is the responder device. The exemplary sequence diagram 1100 can have a total of twelve (12) rows 1102 just as shown for the optimized table 900 in FIG. 9. The exemplary sequence diagram 1100 can have a total of 48 time slots, each time slot approximately 2.5 milliseconds each in duration. During each time slot up to four packets of ranging operations (1106, 1108, 1110, and 1112) can occur. The entire ranging sequence 1114 can last 120 milliseconds, resulting in a measurement rate of 8.3 Hz.

As depicted in FIG. 11, Device 2 is responding device in the Device 1 to Device 2 exchange (1,2) but later in pair (2,3) exchange Device 2 becomes the initiator device. Device 2 can propagate timing information from Device 1. It transmits its poll packet in the (2,3) exchange by forward-projecting the time at which it received Device 1's poll packet in the (1,2) exchange. Each device, except Device 1, when acting as initiator in pair (x, J) must send its poll packet at a time that is a forward projection of when it last received a poll packet in pair (l,x), with device 1 being the most recent device to which it ranged as a responder device. Device 1 (coordinator) is always initiator for this configuration and therefore establishes the timing for all pairwise exchanges in the ranging schedule.

FIG. 12 depicts and exemplary sequence table 1200 when a device(s) leaves the session. The exemplary table 1200 shows twelve (12) rows which achieves the tightest possible scheduling of 45 pairs across four (4) channels. The four channels depicted in FIG. 12 are Ch-1 1202, Ch-2 1204, Ch-3 1206, and Ch-4 1208. For example, assume that six (6) devices of the maximum possible ten (10) devices are active and that Device 4 leaves the ranging schedule. To determine the ranging pairs for the scenario, all the pairs in the ranging schedule with indices larger than six (6) or equal to four (4) can be stuck out. All other pairs can continue ranging per the optimized schedule. The coordinator can continually broadcast an APL. If the coordinator device is dropping or leaving the session, the follower devices can implement a priority routine (e.g., lowest UUID, lowest average range between devices) to determine the new coordinator. The new coordinator can update and broadcast a revised APL to the participating devices.

FIG. 13 depicts an exemplary sequence table 1300 when two new devices enter the session. The exemplary table 1300 shows twelve (12) rows which achieves the tightest possible scheduling of 45 pairs across four (4) channels. The four channels depicted in FIG. 13 are Ch-1 1302, Ch-2 1304, Ch-3 1306, and Ch-4 1308. In exemplary sequence table 1300 Devices 1, 2, 3, 5, and 6 are active and two new mobile devices enter the ranging session. The coordinator can assign indices 4 and 7 to new devices and broadcasts an updated APL on first wireless channel (e.g., a side channel). Each device updates its ranging schedule by including pairs involving Devices 4 and 7. Pairs containing Devices 8 through 10 should remain excludes and thus are crossed out.

In this technique, all devices must align to Device 1's time reference. Device 1 is the master device. Notation (I,J) means device (I) is the initiator/master and device J is the responder/slave device. Device 1 is therefore never a slave device and is always a master device. Each Device x (except Device 1) when acting an initiator in pair (x, J) sends its poll packet at a time that corresponds to a forward projection of when it last observed a poll packet in pair (l,x), with device I being the most recent device to which it ranged to as a responder device. Ranging packets encode the source and destination device addresses so new devices entering the system can quickly acquire timing by observing any exchange between active devices already in the session, (e.g., by observing pair (1, 5) ranging, both devices 4 and 7 can locate themselves on the schedule relative to pair (1,5).

D. Channel Splitting Techniques Flowchart

A preferred method of generating an optimal ranging schedule is positioning of packets within the slot because it provides an orthogonal channels. If only different preambles are used the packets the preambles may not be perfect orthogonal so as the ranging session experiences more and more signals overlapping on top of each other, there is the potential for some cross talk between the channels. The near far problem exists as well. There may be some issues with a device nearby with the wrong preamble, whereas the device is trying to listen to somebody with the desired preamble that may be far away.

Figure 14:
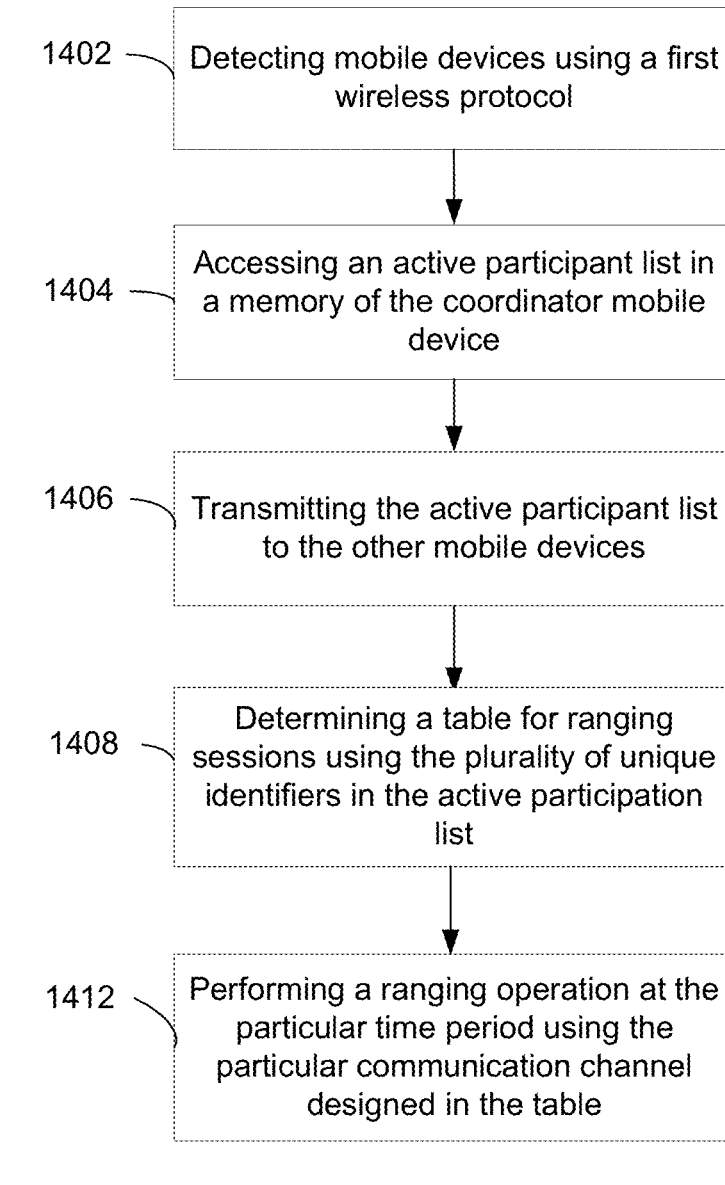
FIG. 14 illustrates a simplified timeline ranging exchange between a first mobile device and a second mobile device.

FIG. 14 illustrates an exemplary flowchart for a ranging technique performed by three or more mobile devices. Method 1400 can be used to determine a spatial relationship of one or more devices to each other. Method 1400 can be performed by any device that acts as a ranging coordinator for N mobile devices that includes other mobile devices, N being an integer of three or more devices.

A coordinator device can be selected from among the participating mobile devices. In one technique each device can be assigned a unique identifier number (e.g., a UUID). In accordance with this technique the coordinator with a lowest unique identifier number can be assigned as the coordinator. In alternate embodiments, the coordinator with the highest unique identifier can be assigned as the coordinator. In other embodiments, a previously determined range between the devices can be used to determine the coordinator. In this embodiment, a coordinator with the lowest range average between devices, being the most central device, can be selected as the coordinator. In still other embodiments, the average signal strength can be used to determine the coordinator device.

At 1402, the coordinator device can detect the other mobile devices using a first wireless protocol. In some embodiments, the coordinator device and transmit a broadcast message. The broadcast message can include an active participant list (APL) containing a list device indexes and unique identifiers for known devices participating in a ranging session. The coordinator device can generate the APL and store the APL in the memory of the coordinator device. Upon receiving the first message, the other participating mobile devices can respond by transmitting a greeting message. The greetings message can include the unique identifier of the responding mobile device of the one or more other mobile devices. The coordinator device can receive the greeting messages from the one or more other mobile devices and use the information contained in the greetings message to update the APL.

The coordinator can transmit a broadcast message on a first wireless channel. The first wireless channel can be a Wi-Fi signal. The 802.11 standard provides several distinct radio frequency ranges for use in Wi-Fi communications: 900 MHz 2.4 GHz, 3.6 GHz, 4.9 GHz, 5 GHz, 5.9 GHz and 60 GHz bands. Each range can be divided into a multitude of channels. The first wireless channel can also be a Bluetooth signal from 2.400 to 2.485 GHz range. The broadcast message can include a plurality of unique identifiers assigned to each of the plurality of mobile devices. In some embodiments the unique identifiers can be a Universally Unique Identifier (UUID).

At 1404, the coordinator can access an active participant list (APL) in a memory of the coordinator mobile device. The active participant list can be stored as a comma-separated values (CSV) file in the memory of the device. The active participant list (APL) can include a plurality of unique identifier s assigned to each of the N mobile devices. The active participant list (APL) can associate each of active mobile devices with a ranging session. The APL can change as participating devices enter and leave the ranging session.

At 1406, the coordinator can transmit the active participant list to the other mobile devices using the first wireless protocol. The other wireless devices in the ranging session can receive the active participant list and save the list in individual memories of the other mobile devices. The other devices can also detect that an active participant list has not been received over a predetermined time period. The predetermined time period can vary, but the purpose is to detect when the designated coordinator device has left the ranging session. The failure to detect the transmission of the active participant list may be an indication that the coordinator has left the ranging session.

At 1408, the coordinator can determine an order for the ranging session. The coordinator can generate a table for ranging sessions using the plurality of unique identifiers in the active participation list. The table can include one or more rows, each corresponding to a different time period, and one or more columns corresponding to one or more communication channels. Each entry of the table specifies a pair of mobile devices designated to perform a ranging operation during a particular time period using a particular communication channel. In various embodiments, the first device listed in the device pair in the APL will be the initiating device for the ranging operation.

At 1410, the coordinator can direct, for each of the other mobile devices, a ranging operation at the particular time period using the particular communication channel designated in the table. In some embodiments, the coordinator can perform a first ranging operation between a first mobile device and a second mobile device on a first channel. The first ranging operation can include transmitting a first request message to the second mobile device at a first transmission time. The first ranging operation can include receiving a first response message from the second mobile device at a first reception time. The one or more processors of the coordinator device can calculate a first distance between the first mobile device and the second mobile device based at least in part in a time difference between the first transmission time and the first reception time. The details of ranging are discussed above with reference to FIG. 1.

In some embodiments, the coordinator device can perform a second ranging operation between the first mobile device and a third mobile device. The second ranging operation can include transmitting a second request message to the third mobile device at a second transmission time. The second ranging operation can include receiving a second response message from the third mobile device at a second reception time. The one or more processors of the coordinator device can calculate a second distance between the first mobile device and the third mobile device based at least in part in a time difference between the second transmission time and the second reception time.

The ranging session can include waiting a delay period following the second ranging operation prior to the second mobile device performing a third ranging session between the second mobile device and a third mobile device. The delay period can commence following a reception of the second response message from the third mobile device.

In some embodiments, the coordinator for the ranging session is determined based in part on the plurality of unique identifiers assigned to each of the N mobile devices. The coordinator for the ranging session can be determined by the mobile device of the N mobile devices with a lowest unique identifier. The lowest unique identifier is a universally unique identifier (UUID).

The technique can include periodically broadcasting the active participation list on the first channel. An indication that the designated coordinator device has left the ranging session is failure to receive the APL over a predetermined time period.

The technique can include receiving an identification message comprising a unique identifier not listed in the active participation list. The technique can include revising the active participation list by adding the unlisted unique identifier to the active participant list. The technique can include transmitting the revised active participant list on the first wireless channel.

The technique can include determining that an identification message for a select mobile device of the N mobile devices has not been received over a predetermined number of ranging sessions. The technique can include revising the active participation list by removing the unique identifier of the select mobile device from the active participant list. The technique can include transmitting the revised active participant list on the first channel.

In some embodiments, a coordinator for the ranging session can determined based in part on a plurality of determined distances between the N mobile devices. In this way a coordinator that is central to the position of devices can be selected as the coordinator. This can help improve the ranging operations because the coordinator would be able to minimize missed ranging operations from extended ranging sessions.

In some embodiments, the technique can include determining a new coordinator following a second mobile device failing to receive a broadcast message from the first mobile device after a predetermined duration of time.

It should be appreciated that the specific steps illustrated in FIG. 14 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

IV. Time-Addition Ranging Technique

A second ranging technique can be used to conduct ranging between multiple devices. The second technique can include multiple devices communicating on a first wireless protocol. The first wireless protocol can be reliable such that a message transmitted on the protocol is likely to be received. The first wireless protocol can be a side channel as described above. The alternate technique uses three basic instruction messages. A first message can be a greetings message that informs the other mobile devices that the device is present and seeks to participate in the ranging session.

A start message can be sent by a coordinator device that informs the remaining devices to execute the ranging session. The coordinator device can be selected from among the techniques described above for the channel splitting technique. A third message can inform that mobile devices that the device is leaving the ranging session. The second technique can use a pre-coded ordering to determine the timeslot, preamble, and ranging schedule for the participating mobile devices.

Once the ranging order between the devices is determined, the ranging between the devices can be conducted in order with predetermined delays between ranging between the devices. The technique can utilize listening windows during which the devices expect to receive ranging messages from the other devices. Each listening window can account for uncertainty due to inaccuracies in the system. The second ranging technique is illustrated in FIG. 15.

A. Timeline for Time Addition Techniques

Figure 15:
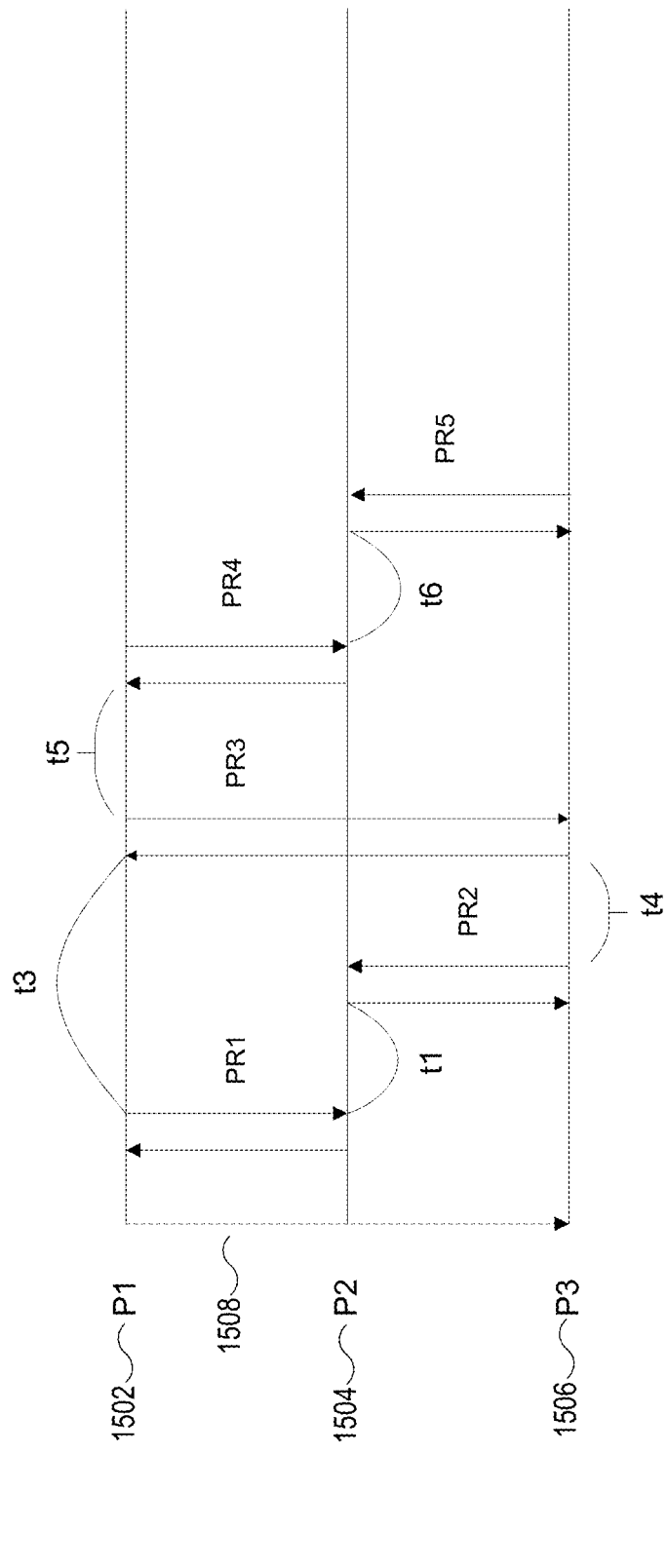
FIG. 15 illustrates a simplified timeline for an alternate technique for ranging between three or more mobile devices.

FIG. 15 illustrates a simplified timeline 1500 for a second technique for ranging between three or more mobile devices. In the simplified timeline 1500, three mobile devices (P1 1502, P2 1504, and P3 1506) establish a link on a first channel. After the link is established, each of the devices transmits a greetings message containing a unique identifier for the mobile device. The devices receive each of the greetings message and based a pre-coded algorithm, the mobile devices can determine both the coordinator, the ordering for the ranging sessions, and the preamble(s) (if any) to be used for ranging.

The coordinator can then transmit a start message 1508. In response the start message, the first device 1502 begins a first ranging operation with the second device 1504. A time marker can be set when range is determined following a ranging session between the first device and the second device. A preset delta t1 after completion of the first ranging operation (or a preset delta t1 from the time marker, the second device 1504 conducts a ranging session with a third device 1506. In this way, the first ranging operation between the first device 1502 and the second device 1504 will not interfere with the second ranging operation between the second device 1504 and a third device 1506. The preset delta t1 can be fixed or variable based at least in part on the number of missed ranging messages indicating collisions between the ranging devices.

A preset time t4 following the completion of the ranging session between the second 1504 device and the third device 1506, the third device 1506 conducts a ranging session with the first device 1502.

A preset delta t3 after the start message, the first device 1502 is programmed to listen for the ranging packet from the third device 1506. The preset delta t3 can be long enough that the third ranging operation will not interfere with the second ranging operation.

In various embodiments, upon completion of the third ranging operation, the ranging session can be repeated. A present time t5 after completion of the third ranging operation, a fourth ranging operation can occur between the first device 1502 and the second device 1504. Similarly, a preset time t6 after completion of the fourth ranging operation, a fifth ranging operation can occur between the second device 1504 and the third device 1506.

The ranging cycle can continue to be repeated as long as the ranging requirement exists or one or more of the mobile devices leave the ranging session.

B. Flowchart for Time Addition Techniques

Figure 16:
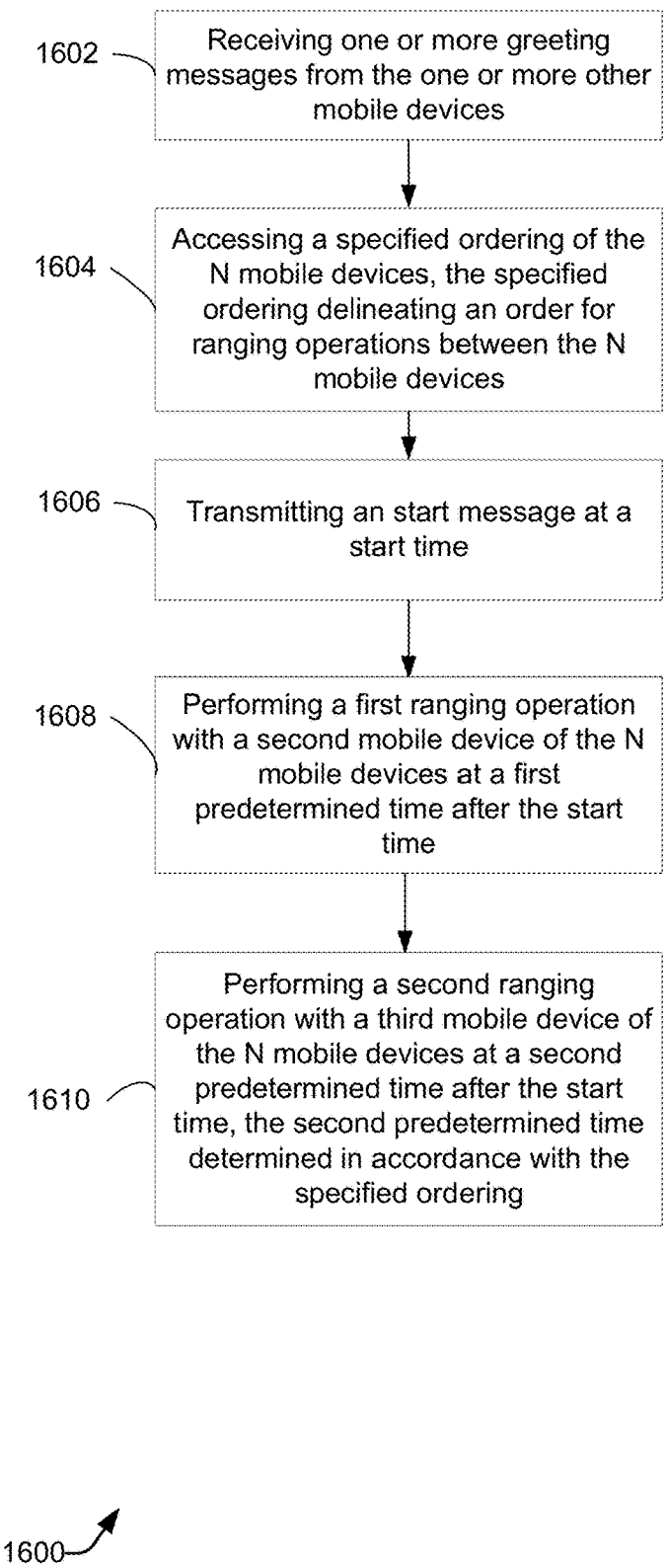
FIG. 16 illustrates a flowchart for a ranging technique performed by a coordinator mobile device.

FIG. 16 illustrates an exemplary flowchart for a second ranging technique performed by three or more computing devices. Method 1600 can be used to determine a spatial relationship of other devices to each other. Method 1600 can be performed by any device that acts as a coordinator device.

A coordinator device can be selected from among the participating mobile devices. In one technique each device can be assigned a unique identifier number (e.g., a UUID). In accordance with this technique the coordinator with a lowest unique identifier number can be assigned as the coordinator. In alternate embodiments, the coordinator with the highest unique identifier can be assigned as the coordinator. In other embodiments, a previously determined range between the devices can be used to determine the coordinator. In this embodiment, a coordinator with the lowest range average between devices, being the most central device, can be selected as the coordinator. In still other embodiments, the average signal strength can be used to determine the coordinator device.

At 1602, a coordinator device can receive, using a first wireless protocol, one or more greeting messages from the one or more other mobile devices. The greeting messages can containing unique identifiers (e.g., UUID) for each of the one or more mobile devices. The greeting message can be transmitted on a first wireless channel. The first wireless channel can be a Wi-Fi or Bluetooth channel. The purpose of the greetings messages is to inform the other participating devices that the device will be conducting ranging operations. The information contained in the greetings messages can be used to determine the devices participating in the ranging session.

At 1604, the coordinator device can access, in a memory, a specified ordering of the N mobile devices. The specified ordering can delineating an order for ranging operations between the N mobile devices. The specified ordering can determined using the unique identifiers of the N mobile devices. N is an integer of at least three or greater. The specified ordering can be stored in a memory of each of the participating mobile devices. Therefore, after receipt of the greetings messages from each of the participating mobile devices, each device can reference the specified ordering store in memory and know when and with which each the mobile devices can conduct ranging.

At 1606, the coordinator device can transmit a start message at a start time. The start message can include a start command to begin a ranging session. The start message can be transmitted on the first wireless channel. The start message can be received by the other mobile devices participating in the ranging session.

At 1608, the coordinator device can perform a first ranging operation with a second mobile device of the N mobile devices at a first predetermined time after the start time. The first predetermined time can be determined in accordance with the specified ordering. The predetermined time can be stored in the memory of each of the devices. The details of ranging are discussed above with reference to FIG. 1.

At 1610, the coordinator device can perform a second ranging operation with a third mobile device of the N mobile devices at a second predetermined time after the start time. The second predetermined time can be determined in accordance with the specified ordering.

In various embodiments, the technique includes receiving a first response message at a second time from a second mobile device in response to the second mobile device receiving the start message. The technique can include calculating a first distance between the first mobile device and the second mobile device based at least in part on a first elapsed time between the first time and the second time. The technique can include receiving a second response message at a third time from a third mobile device during a listening period, the listening period occurring during a time window beginning a first preset time after transmitting the start message. The technique can include calculating a second distance between the first mobile device and the third mobile device based at least in part on a second elapsed time between the first time and the third time.

In various embodiments, the technique can include receiving a third distance between the second mobile device and the third mobile device, the third distance calculated by the second mobile device during a second ranging operation, the second ranging operation occurring a second preset time after a first ranging operation between the first mobile device and the second mobile device.

In various embodiments, the technique can include receiving a greeting message from a new mobile device to the ranging session. The technique can include revising the stored ordering in the memory of the mobile device to include a new unique identifier for the new mobile device.

In various embodiments, the technique can include receiving a departure message from a departing mobile device of the plurality of mobile devices in the ranging session. In various embodiments, the technique can include revising the stored ordering in the memory of the mobile device by removing the unique identifier for the departing mobile device.

In various embodiments, the technique can include receiving a third response message from the second mobile device during a second listening period, the second listening period occurring a third prescribed time after transmitting the start message.

It should be appreciated that the specific steps illustrated in FIG. 16 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

V. Setup and Ranging Using Two Protocols

A In some embodiments, two wireless protocols can be used. An authentication and setup phase can be implemented using a first wireless protocol (e.g., Bluetooth Low Energy (BLE) or other Bluetooth). A second (ranging) wireless protocol can be used to perform ranging measurements. Accordingly, a first wireless protocol link between a mobile device (e.g., a phone, tablet, or a watch) and another mobile device can be used for authentication, and then used to initiate and control a second wireless protocol (e.g., UWB) for ranging and exchange of distance information. For example, the first wireless protocol can provide a low power framework to negotiate security keys, ranging operations, and to initiate ranging over UWB.

A. Flowchart

Figure 17:
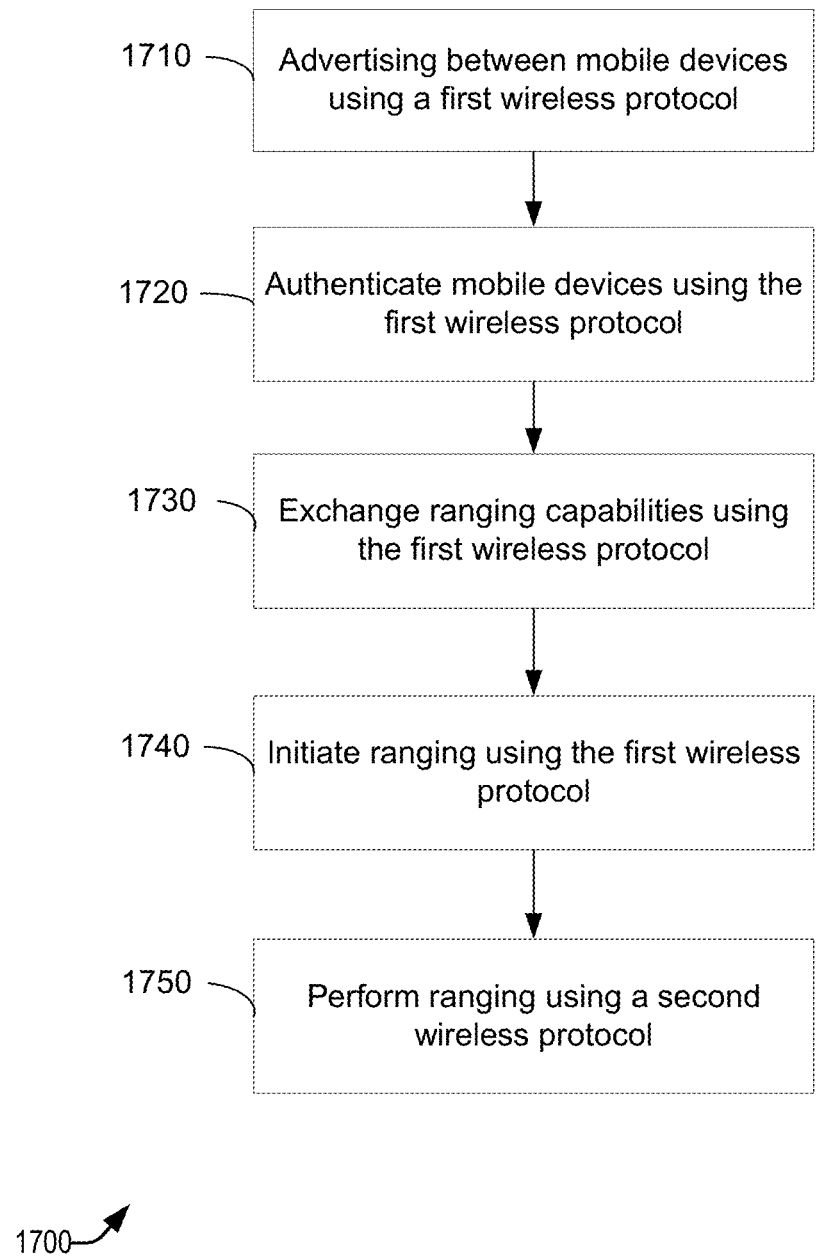
FIG. 17 illustrates a flowchart illustrating a method for performing, by a first (sending) mobile device, a ranging operation with a second (receiving) mobile device involving two wireless protocols according to embodiments of the present disclosure.

FIG. 17 is a flowchart illustrating a method 1700 for performing, by a first (sending) mobile device, a ranging operation with a second (receiving) mobile device involving two wireless protocols according to embodiments of the present disclosure. A first wireless protocol (e.g., Bluetooth) can be used for authentication, and a second wireless protocol (e.g., UWB) can be used for a ranging measurement.

At block 1710, the mobile devices communicate advertisements using a first wireless protocol, e.g., BLE. A mobile device can transmit advertisements at a particular rate, and scan for advertisements from other mobile devices at a particular rate. The advertisements can include an authorization tag for each of the mobile devices to authenticate each other, e.g., to confirm that they have been registered with a third party, such as a manufacturer of the mobile devise. Such a third party (also called an authentication server) can generate the authentication tag using an identifier from the mobile device (or from a user of the mobile device) and provide to the mobile device, which can then transmit the authentication tag in an advertisement. As an example, an authentication tag can be generated using a hash function.

As examples, an identifier that is the authentication tag or is used to generate the authentication tag can include an identity address (e.g., media access control (MAC) address). For example, a unique 48-bit address can be used for each mobile device. An authentication tag can be updated periodically. Advertisements can also include an ID associated with the authentication tag (e.g., to retrieve additional information, such as a public certificate) and one or more commands, e.g., for a receiving mobile device to wake up.

At block 1720, the mobile devices are authenticated using the first wireless protocol. For example, the receiving mobile device can detect an advertisement and obtain an authentication tag. The authentication tag can be compared to a list of authentication tags stored on the mobile device, e.g., corresponding to a contact list. When a mobile device adds a contact, the corresponding authentication tag can be obtained from an authentication server. The mobile device can then detect when an advertisement includes an authentication tag already stored on the mobile device. In some implementations, a new authentication tag can be sent to the authentication server to confirm that an identifier and an authentication tag match.

In response to authentication by the receiving mobile device or generally as an advertising mode, the receiving mobile device can also send an advertisement that includes an authentication tag. In other embodiments, authentication is not performed.

As part of the communication using the first wireless protocol, a secure communication channel can be established so that messages can be encrypted. For example, the communication can result in a shared secret being saved on both devices, where the shared secret can be used for future authentications (e.g., via a challenge response) and/or encryption of messages between the mobile devices.

At block 1730, the mobile devices can exchange ranging capabilities (settings) using the first wireless protocol. The exchange of ranging capabilities can ensure that the signaling between mobile devices is performed in a consistent manner by both devices. Such exchange can allow the mobile device to adapt to different devices, e.g., ones with different numbers and types of antenna units. Example ranging capabilities can include specifying a format for ranging messages between the mobile devices, a frequency range to use, a number of antenna units for each device, and encryption protocols for ranging messages using the second wireless protocol.

At block 1740, ranging can be initiated using the first wireless protocol. In some implementations, the initiation can be started by a ranging request message sent from a sending mobile device. The responding device can respond with a start notification event (message). Once the start notification event occurs, ranging can be performed using a second wireless protocol, e.g., by turning on corresponding radios within a specified time of receiving the start message. Such coordination between the first and second wireless protocols can synchronize the devices such that antenna(s) of the second protocol do not have to be on all the time, thereby saving power.

At block 1750, ranging can be performed using a second wireless protocol (e.g., UWB). After the initiation signals using the first wireless protocol, the receiving device can begin scanning for ranging signals at a specified time using one or more antennas corresponding to the second wireless protocol. The one or more antennas can receive one or more ranging request messages and send one or more ranging response messages.

Circuitry of the receiving device can perform various levels of processing of such ranging messages, e.g., to determine time stamps. The sending device can receive the ranging response messages and determine time stamps for the transmission of the one or more ranging request messages and time stamps for the one or more ranging response messages, e.g., as shown in FIGS. 1 and 2. The sending device can use the times to determine a distance between the mobile devices. The ranging can be performed once, a specified number of times, or continue until a stop ranging request is processed.

A mobile device may have multiple antennas for the first wireless protocol (e.g., various forms of Bluetooth (BT), such as BLE). BT can use short-wavelength ultra-high frequency (UHF) radio waves in the ISM band from 2.4 to 2.485 GHz. Certain modes of the first wireless protocol can be used over a relatively long range. For example, one BT radio can increase a communication range by using a lower packet coding of 125 kbps or 500 kbps and by increasing a maximum transmission power (e.g., to +20 decibel-milliwatts (dBm)). Such a radio can be used for both advertising and data packets and provide range up to 100 meters, as opposed to a lower power mode that may work only up to 20 meters.

Thus, if a user was approaching the other mobile moving at a rate of 1.5 meters per second, the 100 meter range would still provide sufficient time for authentication and to negotiate ranging parameters, as well as send a ranging start message. Such extra time to establish communication can be advantageous when there can be interference from other devices, which might otherwise delay detection of the mobile device and start of ranging.

But, these packets can be roughly 2 to 8 times longer duration, e.g., up to about 16 milliseconds, which does not make them suitable for ranging. A one microsecond pulse provides a range that is +/−300 meters. And, even regular power modes for BT provide pulses that are not suitable for ranging.

B. Sequence Diagram

Figure 18:
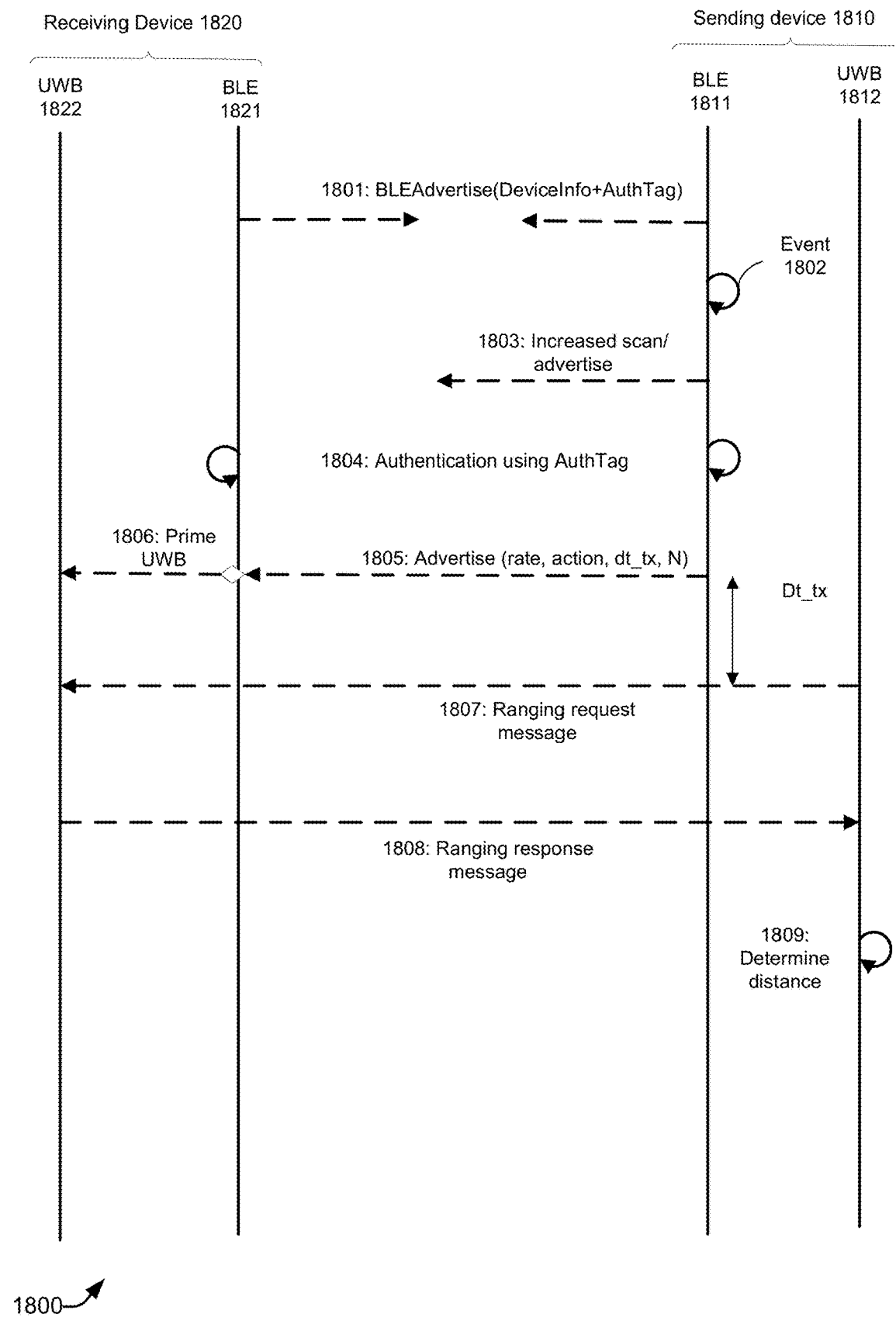
FIG. 18 shows a sequence diagram of communications between a sending device and a receiving device involving BLE and UWB protocols according to embodiments of the present disclosure.

FIG. 18 shows a sequence diagram of communications between a sending device 1810 and a receiving device 1820 involving BT and UWB protocols according to embodiments of the present disclosure. The mobile devices can be in a screen off state or be actively in use by a user. Certain steps of the sequence diagram may be optional.

At 1801, a BLE antenna 1811 of sending device 1810 transmits an advertisement signal, and BLE antenna 1821 transmits an advertisement signal. The devices can broadcast advertisement signals at a specified duty cycle, without the user having to provide any user input. As shown, the advertisement signal includes device information and an authentication tag. The device information can correspond to information about the device, such as type of device (e.g., a watch, a tablet, or a phone), a state of the device (e.g., whether unlocked or orientation, such as on a wrist or in a pocket), and a version of a protocol or other software. The devices can also scan at some duty cycle. Authentication can occur as part of 1801.

Each device registered with an authentication server can have a unique authentication tag. In various embodiments, the authentication tag can involve use of public keys, certificates, and digital signatures. For example, a device can store the public keys of someone in their contact list, and can authenticate a digital signature from a sending device using the public key.

At 1802, an event is detected at sending device 1810. As an example, the event could be a user input, e.g., an indication of an intent to share data. As another example, the event could be a detection of an advertisement from a receiving device that is being tracked by the sending device, e.g., to provide a reminder to the user of the sending device. Further details about such examples are provided later.

At 1803, a BLE antenna 1811 transmits and scans at a higher duty cycle. The increased advertisement and scanning can be part of a discovery process for the two devices to detect each other, so that a connection can be created. For example, if sending device 1810 detects input that a ranging operation has been requested or is likely to be requested, the increased advertisement/scan can provide quicker establishment of a communications session using the first wireless protocol.

At 1804, sending device 1810 and receiving device 1820 authenticate the other device using an authorization tag. The authentications by the two devices can occur at different times or a same or similar time. The authentication by may occur after later steps, e.g., after transmitting of an advertisement with ranging settings (1805) and ranging request messages (1807) has begun. At this point, a BLE connection can be considered as created between the two devices.

In some embodiments, as part of establishing a BLE connection, each device can obtain keys for performing encrypted (secure) communications. If a connection was previously made, keys could be re-used. The authentication tag can be used to retrieve stored key(s) for performing the encryption/decryption of future BLE messages.

At 1805, BLE antenna 1811 transmits an advertisement signal that includes an action command (e.g., that ranging is being requested) and one or more ranging settings. The advertisement can also include an authentication tag. As shown, the ranging settings include rate, dt_tx, and N. The rate can specify a time (e.g., 300 milliseconds (ms) for a default transmit/scan rate or 30 ms for an increased transmit/scan) and N can specify a multiple, thereby providing a time delay between each ranging request message. The time offset dt_tx specifies a time after an advertisement signal that the ranging request message is sent. In this manner, receiving device 1820 knows when UWB antenna 1822 should be turned on. Such an advertisement signal can be sent after authentication has been performed by sending device 1810, and potentially after receiving device 1820 acknowledges having performed its authentication. In some embodiments, an action command in the advertisement can cause a processor of the receiving device 1820 to wake up, or at least for the UWB circuitry (or other circuitry of a first wireless protocol) to be initialized.

The advertisement in 1805 can be considered part of a ranging setup handshake. In some embodiments, receiving device 1820 can send a message to sending device 1810 acknowledging receipt of the ranging settings, or potentially proposing a change to the settings. The ranging setup handshake can include the ranging capabilities of the two devices. Information about the UWB antennas can be provided as different devices can have different numbers of UWB antennas, or a device may want to only turn on a few. A coarse ranging may occur at first, with finer ranging using more UWB receivers occurring after the mobile devices are closer. Other settings/parameters may be provided between ranging operations, e.g., as part of a dynamic decision or updating of software or physical components.

Other examples for ranging capabilities include a number of antennas, location of those antennas (e.g., a relative distances between the antennas), how many antennas to use, encryption protocols, packet format, modes of operation, and supported frequency range. Such capabilities may reflect a software update of either device, resulting in a new or different capability. The ranging setup handshake can include a negotiation about how to carry out the ranging, such as how often to range or how to schedule the ranging (e.g., when there are multiple receiving devices—round robin, one at a time, or other options). A sending device may know it is connected to three different devices, and thus the mobile device may want a lower rate of range measurements to each device (e.g., 25 milliseconds) or schedule a particular time/frequency to perform ranging with each device. A duty cycle for when the UWB radios are on can be specified, e.g., 1 kilohertz (KHz) or 10 KHz. For instance, when a start message is received, the devices can agree to start ranging 100 milliseconds (or 90 milliseconds for extra margin) from advertisement at 1805 and then every 1 KHz after that.

The ranging setup handshake can also manage encryption of the UWB messages, e.g., by deriving a new set of sessions keys for UWB ranging. The keys can be updated periodically, e.g., for each session or every Nth session. In some embodiments, the session keys can be derived from a common shared secret that was used in a challenge-response for authentication, where the derivation uses default or negotiated procedures. Accordingly, the ranging setup handshake can act as a control channel to inform the receiving device about what to expect for the ranging. The ranging setup handshake messages can specify a destination address so as not to cause confusion with any other nearby devices.

At 1806, receiving device 1820 initiates actions to turn on a UWB antenna 1822, or multiple UWB antennas. Such initial steps can prime some circuitry so that UWB antenna 1822 is in a ready state, but potentially not fully turned on. This may be the first time that receiving device 1820 was able decode an advertisement signal with the ranging settings. Such decoding may occur after receiving device 1820 was able to authenticate sending device 1810 by a previous advertisement signal.

At 1807, sending device 1810 sends a ranging request message using UWB antenna 1812. The ranging request message is sent dt_tx milliseconds after the advertisement signal in 1805. Receiving device 1820 knows this timing offset, and thus can turn on UWB antenna 1822 within a time window after having detected the advertisement in 1805. Other ranging request messages may have been sent previously while not being detected by receiving device 1820. For ease of illustration, only one ranging request message is shown. Other advertisements may also be sent before 1805, but were not detected by receiving device 1820. The ranging request message can specify a destination address of receiving device 1820, which can allow other nearby devices to the ranging request message.

At 1808, receiving device 1820 sends ranging response message using UWB antenna 1822. The ranging response message may include times as described for FIGS. 1 and 2.

At 1809, sending device 1810 determines distance information using times when the ranging request message was sent, times in the ranging response message, and when the ranging response message was received. Examples techniques for determining the distance information are described herein, e.g., for FIGS. 1 and 2.

In some embodiments, a frequency correction can be determined. For example, a frequency offset of the receiving oscillator (clock) with respect to the sending oscillator can allow a determination of distance within a fairly accurate range, e.g., down about 20, 30, or 40 cm. As to using a frequency offset, the sending device can broadcast that its clock is running at a particular rate, e.g., on a particular channel, such as 5 or 9. A resulting frequency error can be used to correct a relative clock drift rate between the clocks, which can improve the accuracy. Other formulations can use an additional messages to further improve the accuracy of the ranging measurement, e.g., as described in U.S. patent application Ser. No. 15/983,388, which incorporated in its entirety for all purposes.

Further ranging can be performed. For example, more than one distance can be determined, which can be used to determine a trajectory, determine greater accuracy, or confirm that the two devices are within a stable proximity to each other (e.g., to estimate that the two users are interacting with each, as may occur during a meeting or a conversation). Such information about a stable proximity can be used to trigger a reminder.

C. Example Ranging Protocol

An example format for a ranging service message format can provide a code (e.g., one octet long) that indicates the type of the message. The length field (e.g., two octets long) can indicate the size in octets of the data field of the message, which may not include the code and length fields. The data field can be variable in length. Thus, the code field can determines the format of the data field and the length field can indicate the length of the data field.

The ranging setup (capability) handshake can be initiated at the start of every connection to exchange state of UWB devices on the mobile devices. The ranging capability request message can have a particular ID code (e.g., 1). Some example parameters for this message include supported features mask, required features mask, software version, link identifier, number of UWB radio devices, and a UWB device descriptor.

The software version parameter can indicate the current ranging software version running on the initiator device. The link identifier can be a random number that allows the responder to match the received UWB packets to the BT connection with the initiator. Thus, the link identifier can be included in UWB messages.

The mobile devices can maintain two features masks: a supported features mask and required features mask. The supported features mask can indicates supported features. The features mask parameter can be a bit mask of all features. For each feature, a single bit can be specified, e.g., set to 1 if the feature is supported and set to 0 otherwise. Example features are secure ranging, 1-1 ranging (e.g., 1 device to 1 device), and 1-many ranging. The required features mask can indicate required features. For example, support for secure ranging and 1:1 ranging can be mandatory.

The UWB device descriptor can have one entry for each available UWB antenna device (e.g., antenna or node with more than one antenna). A features request message can have one UWB device descriptor entry for each UWB device on the initiating device. Each of the UWB antenna devices can be characterized by a UWB device descriptor with the following parameters: firmware version—version of current UWB firmware; hardware version—version of current UWB hardware; manufacturer name—name of UWB manufacturer. The number of UWB devices available can be specific to a particular ranging session. The link identifier can map a BT link to UWB packets.

The ranging capability response message can be similar to the ranging capability request message. The responder may be designated for sending this message. If the responder does not support any feature listed in the required features of the ranging capability request message, the responder can respond with an additional ranging command complete message with an unsupported feature error code. The ranging capability response message can includes the parameters: supported features, software version, number of UWB devices, and UWB device descriptor.

VI. Ultra-Wide Band Acquisition Packets (UAPS)

Ultra-Wide Band transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging for the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 MHz. Bluetooth defines two transmissions types: data and advertising transmissions. As such, three of these 40 channels are dedicated to advertising and 37 dedicated to data. Advertising allows devices to broadcast information defining their intentions.

The packet containing the UWB transmission time (referred to as UWB Acquisition Packet (UAP)) can be structured to occur at a specific time relative to the transmitting device's BLE advertisements. Accordingly, the receiving device can listen for the UAPs at an expected time or during an expected time window around the expected time. The UAPs can convey the time of the next UWB poll transmission, which is part of a ranging measurement. For example, ranging requests can be considered poll transmissions. The receiver device can use the time in the UAP to determine when to listen for the next poll. The UAPs can also be transmitted in the UWB frequency range. The technique can also anchor the UAP transmission timing to any other long time sequence such as Apple Wireless Direct Link (AWDL) protocol currently used for Airdrop features.

Figure 19:
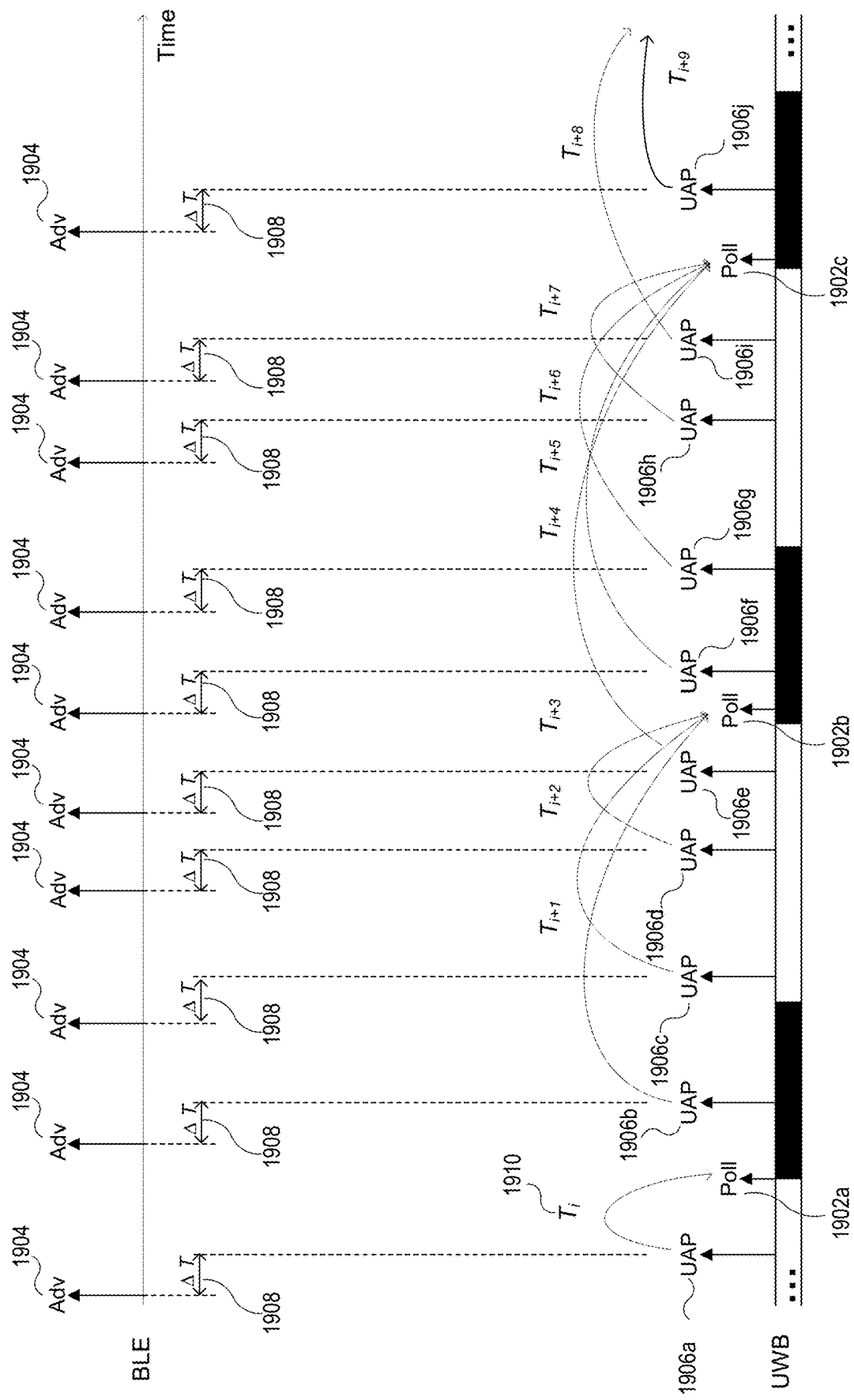
FIG. 19 illustrates an exemplary depiction of a timeline for using advertisement signals to synchronize the timing for transmission of Ultra-Wide Band Acquisition Packets (UAPs).

FIG. 19 illustrates an exemplary depiction of a timeline 1900 for using the BLE advertisement signals to synchronize the timing for transmission of UAPs. FIG. 19 illustrates a timeline 1900 for transmission of multiple signals (e.g., UWB signals and BLE signals) from a single device. A transmitter device can transmit a UWB poll 1902 at regular intervals (e.g., every 100 milliseconds). The transmitter device can also transmit BLE advertisements 1904 more frequently than the UWB poll 1902 transmissions. For example, the BLE advertisements 1904 can be transmitted approximately every 30 milliseconds. The BLE advertisements 1904 can be transmitted irregularly to avoid collisions between data packets. Thus, BLE advertisements 1904 can be transmitted at a predetermined interval (e.g., every 30 seconds) plus some random delay of 0 to 10 milliseconds. This provides random dithering between advertisements. The transmitter device can transmit a UAP message 1906 at a fixed time interval (ΔT) 1908 following the transmission of the BLE advertisement 1904. The time interval (ΔT) 1908 can be predetermined so the receiving device can know to listen for the UAP message 1906 after a predetermined time after transmission of the BLE advertisement 1904.

The transmitter device can calculate the time duration between the transmission of the UAP message 1906 and the next UWB poll 1902. For example, as shown in FIG. 19, the time ($T_i$) is the time interval between the first UAP message 1906a and the first UWB poll 1902a. In some embodiments the time interval can be around 200 microseconds. The UAP message 1906a can include the time (T$_i$) information. A receiving device that captures the UAP message 1906 can determine that the next UWB poll 1902b will occur at a time interval T$_i$ 1910 after receiving the UAP message 1906, thereby synchronizing the clocks between the transmitting device and the receiving device.

FIG. 19 illustrates three UAP messages 1906b-d between the first UWB poll 1902a and the second UWB poll 1902b. Each of the UAP messages 1900b-d can include the time intervals (e.g., T$_{i+1}$, T$_{i+2}$, and T$_{i+3}$) until the second UWB poll 1902b. Each of the time intervals (T$_{i+1}$, T$_{i+2}$, and T$_{i+3}$) would be different because the time until the next UWB poll 1902b would decrease as time progresses. In some cases, such as for UAP message 1906e, there is not enough time remaining prior to the next UWB poll 1902b. In these cases, the UAP message 1906e provides the time to the subsequent UWB poll 1902c. This process can repeated as necessary.

In many-to-many ranging scenarios, the UWB poll 1902 may be the start of the ranging round such at the ranging request 101 shown in FIG. 1 or during slot 1106 in FIG. 11. The UAP messages 1906 can provide the time delay until the next UWB poll 1902 (show in slot 1118 in FIG. 11) to start the next round. An individual device can know the schedule for ranging (e.g., schedules shown in FIG. 8, 9, or 10) and use the UAP message 1906 to identify when a particular request might come from a sender in a particular slot of a round. A pair is identified for a slot of a round, and the sender of that pair is predetermined. The beginning of that slot can be determined based on a predetermined delay relative to the first poll. Based on the designated time slot for ranging, the device pairs can add a known delay to the time of the UWB polling signal 1902 to conduct ranging.

In various embodiments, the UAP messages 1906 can provide additional information such as the time until the next slot. In that way, once the receiving device received the UAP messages 1906, the receiving device knows both timing and schedule for conducting ranging. In these embodiments, the UAP messages 1906 many not need to point to the second and third polling signals. Accordingly, embodiments can rely on a first poll for the initial timing and adjust delay on a given schedule for when future UWB signals are expected. In another example, each round can be defined by information in a UAP signal.

In various embodiments, the UAP messages 1906 can be used within designated timeslots for ranging between devices or to specify when a next time slot is to begin, where predetermined time offsets from a given start of a timeslot can be used to determine a time window to begin listening for UWB signals. The UAP messages 1906 can provide the next UWB polling signal 1902 for ranging between the two devices during that individual round. In other embodiments, the UAP messages 1906 can be used when a new receiving device is joining the ranging session. The UAP messages 1906 can be used to convey timing information to inform the new device of the time for starting the ranging round.

Figure 20B:
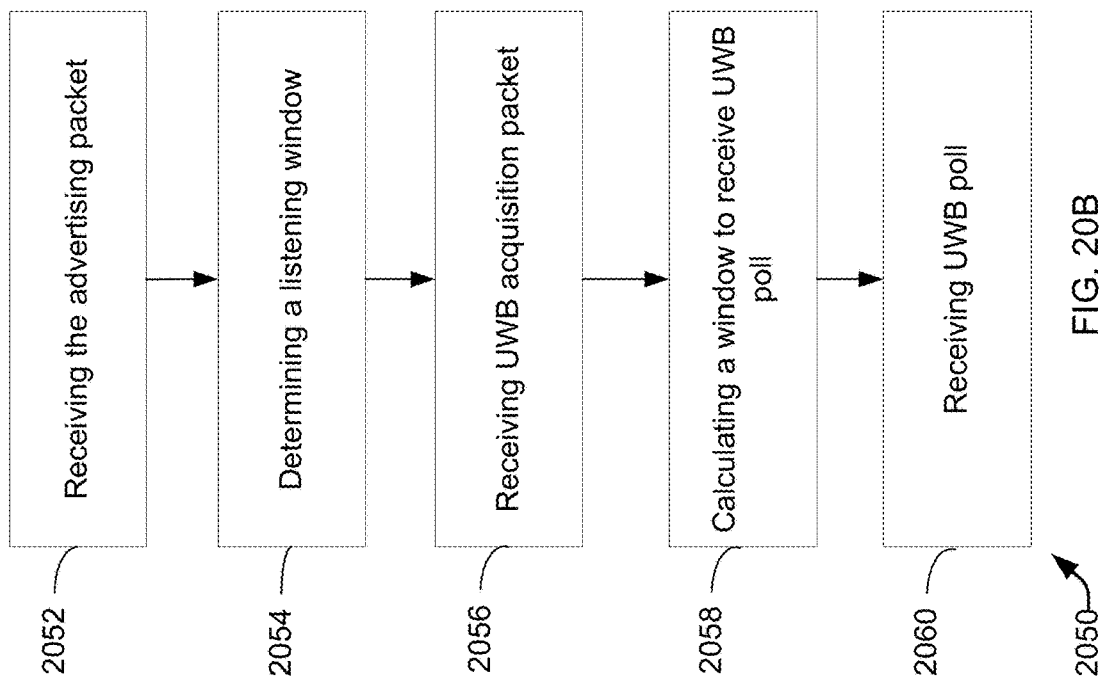
FIGS. 20A-B illustrates an exemplary flowchart for a transmitting and receiving Ultra-Wide Band Acquisition Packets (UAPs).
Figure 20A:
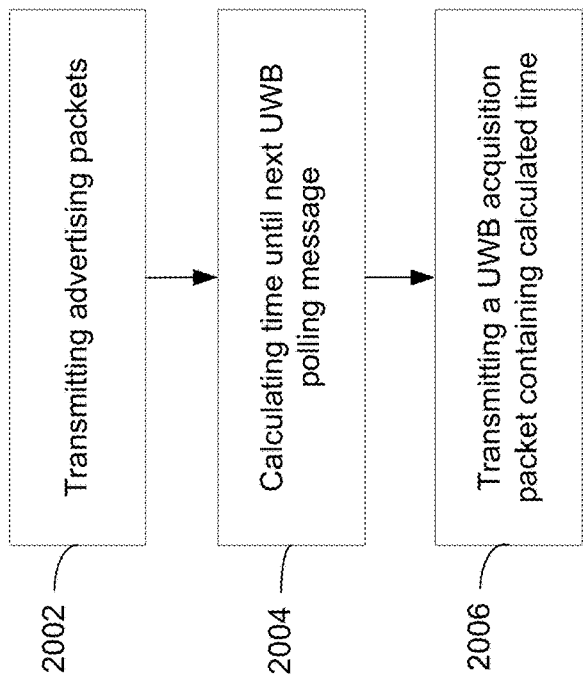

FIG. 20A illustrates an exemplary flowchart for transmission of UWB acquisition packets by a beacon. FIG. 20B illustrates an exemplary flowchart for reception of UWB acquisition packets by a receiving device. Method 2000 can be used to provide the time of the UWB poll signals. Method 2000 can be performed by any device that acts as a sending/beacon device.

At 2002, the beacon device can transmit advertising packets using a first wireless protocol. The protocol can be Bluetooth Low Energy (BLE) advertising but other protocols can be used. The advertising packets can be routinely transmitted by the transmitting device. The advertising packets can include information such as: Preamble, Access Address, cyclic redundancy check, address of the sender, and advertising payload. The advertising packets can be received by receiving mobile devices. For example, the advertisements can be transmitted approximately every 30 milliseconds. The advertisements can be transmitted irregularly to avoid collisions between data packets. So advertisements can be transmitted at a predetermined interval (e.g., every 30 seconds) plus some random delay of 0 to 10 milliseconds. This provides random dithering between advertisements.

The transmitting device can wait a predetermined time period after transmitting the advertising packets. In some embodiments the predetermined time period may be 200 microseconds. Receiving devices can be programmed to activate (if in a powered-off or reduced-power mode) to listen for the UWB acquisition packet during this predetermined time period after receiving the advertising message.

At 2004, the beacon can calculate the time under the next UWB poll transmitted using the second wireless protocol. The UWB poll can be a ranging request message. UWB poll can be routine transmitted (e.g., every 100 milliseconds) by the beacon device. The beacon device knows the time of the transmission of the advertising packets, the predetermined delay, and the time of the next UWB poll. Therefore, the beacon can calculate the time from the advertising packets and the next UWB poll. This calculated time can be included in the UWB acquisition packet. In various embodiments, there can be multiple UWB acquisition packets between each of the UWB poll. Therefore, each UWB acquisition packets can include different calculated times.

At 2006, the beacon can transmit, using the second wireless protocol, the UWB acquisition packet including the calculated time until the next UWB poll. The UWB acquisition packet can be transmitted a predetermined time (e.g., ΔT in FIG. 19) window after transmitting the advertising packet. The receiving device(s) can receive the UWB acquisition packet and use the calculated time to know when (e.g., a time range) to listen for the next UWB poll.

Method 2050 can be used to identify a time for receiving UWB poll signals. Method 2050 can be performed by any device that acts as a receiving device.

At 2052, the receiving device can receive the advertising packet via a first wireless protocol. The first wireless protocol can be BLE or another compatible wireless protocol. The adverting packet can be received at an irregular schedule to avoid missed messaged due to collisions between packets.

At 2054, the receiving device can determine a first window to listen for the UWB acquisition packet based on a fixed time interval (ΔT) from the reception of the advertising packet. The fixed time interval can be predetermined by programming. The fixed time interval (ΔT) can be used to create a first listening window slightly before and after the time of reception of the advertising packet plus the fixed time interval (ΔT). The start and end of the first time window can be variable. The first listening window can be used for receiving the UWB acquisition packet (UAP). Receiving devices can be programmed to activate (if in a powered-off or reduced-power mode) to listen for the UWB acquisition packet during this first time window after receiving the advertising message.

At 2056, the receiving device can listen in a first time window around an expected time and receive the UWB acquisition packet via a second wireless protocol. In some embodiments, the second wireless protocol can be UWB. In various embodiments, UAPs are transmitted over UWB, in order to convey more accurate timing information about the UWB poll packet. Such accurate timing information is more suitably conveyed when UAPs exist in the same time domain as the UWB chip's clock. The device can process the time information contained within the packet. The time information can be stored in the memory of the receiving device.

At 2058, the receiving device can use the time information from the UWB acquisition packet to calculate a second window to receive the UWB poll. The receiving device can determine a window that starts at a first set time before the UWB poll to a second set time after the UWB poll. The receiving device can be enter or remain in a powered-off or reduced-power mode until the beginning of the second window thereby reducing power requirement for the receiving device.

At 2060, the receiving device receives the UWB poll. The UWB poll provides information for the ranging session to the receiving device. The receiving device can use the information in the UWB poll to participate in the ranging session. In some embodiments, at a selected time period the receiving device transmits a response message.

It should be appreciated that the specific steps illustrated in FIG. 20 provides particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Mobile Device for Performing Ranging

Figure 21:
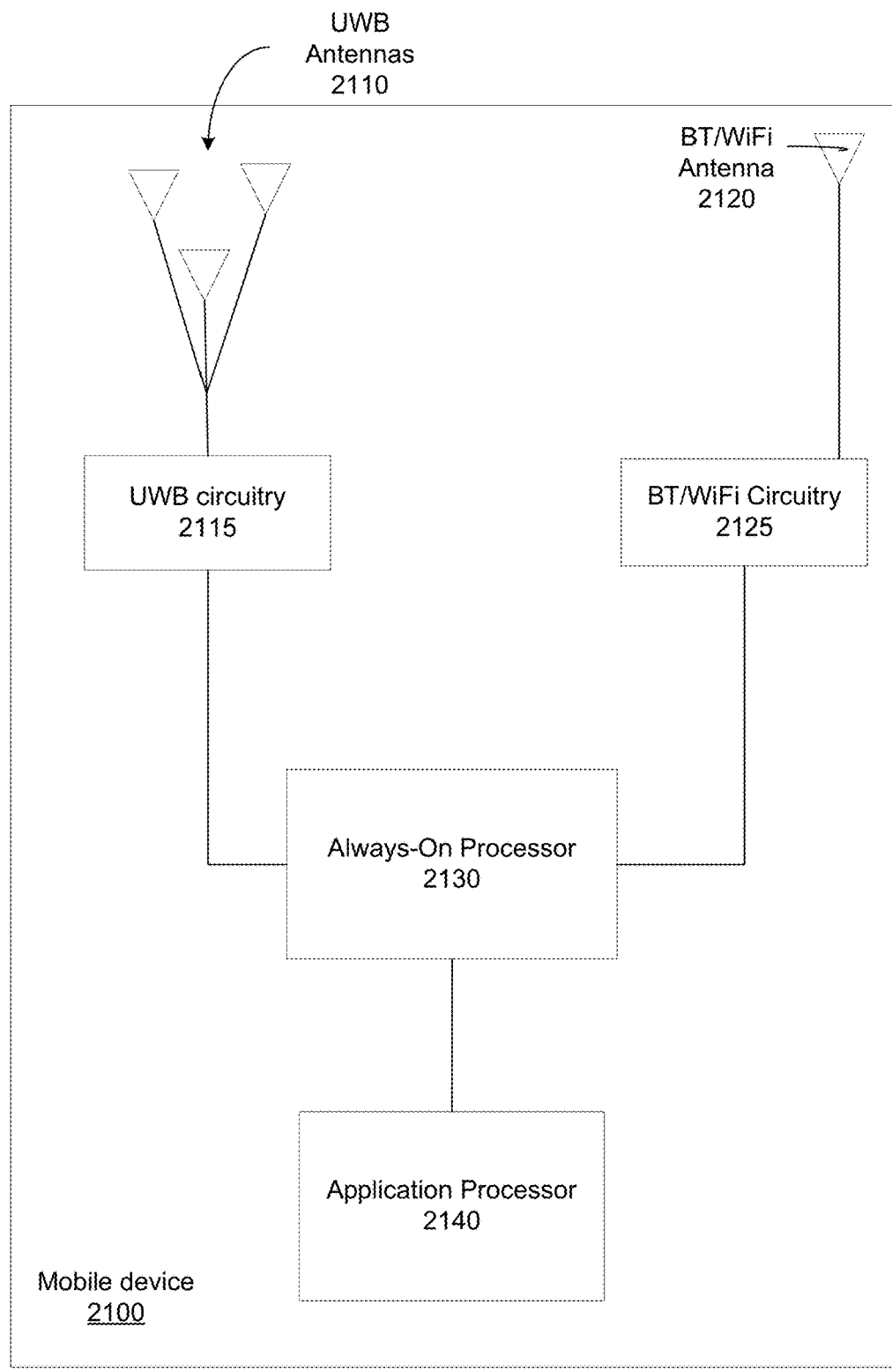
FIG. 21 is a block diagram of components of a mobile device operable to perform ranging according to embodiments of the present disclosure.

FIG. 21 is a block diagram of components of a mobile device 2100 operable to perform ranging according to embodiments of the present disclosure. Mobile device 2100 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 2100 includes UWB antennas 2110 for performing ranging. UWB antennas 2110 are connected to UWB circuitry 2115 for analyzing detected signals from UWB antennas 2110. In some embodiments, mobile device 2100 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 2115 can communicate with an always-on processor (AOP) 2130, which can perform further processing using information from UWB messages. For example, AOP 2130 can perform the ranging calculations using timing data provided by UWB circuitry 2115. AOP 2130 and other circuits of the device can include dedicated circuitry and/or configurable circuitry, e.g., via firmware or other software.

As shown, mobile device 2100 also includes Bluetooth (BT)/Wi-Fi antenna 2120 for communicating data with other devices. BT/Wi-Fi antenna 2120 is connected to BT/Wi-Fi circuitry 2125 for analyzing detected signals from BT/Wi-Fi antenna 2120. For example, BT/Wi-Fi circuitry 2125 can parse messages to obtain data (e.g., an authentication tag), which can be sent on to AOP 2130. In some embodiments, AOP 2130 can perform authentication using an authentication tag. Thus, AOP 2130 can store or retrieve a list of authentication tags for which to compare a received tag against, as part of an authentication process. In some implementations, such functionality could be achieved by BT/Wi-Fi circuitry 2125.

In other embodiments, UWB circuitry 2115 and BT/Wi-Fi circuitry 2125 can alternatively or in addition be connected to application processor 2140, which can perform similar functionality as AOP 2130. Application processor 2140 typically requires more power than AOP 2130, and thus power can be saved by AOP 2130 handling certain functionality, so that application processor 2140 can remain in a sleep state, e.g., an off state. As an example, application processor 2140 can be used for communicating audio or video using BT/Wi-Fi, while AOP 2130 can coordinate transmission of such content and communication between UWB circuitry 2115 and BT/Wi-Fi circuitry 2125. For instance, AOP 2130 can coordinate timing of UWB messages relative to BT advertisements.

To perform ranging, BT/Wi-Fi circuitry 2125 can analyze an advertisement signal from another device to determine that the other device wants to perform ranging, e.g., as part of a process for sharing content. BT/Wi-Fi circuitry 2125 can communicate this notification to AOP 2130, which can schedule UWB circuitry 2115 to be ready to detect UWB messages from the other device.

For the device initiating ranging, its AOP can perform the ranging calculations. Further, the AOP can monitor changes in distance between the other devices. For example, AOP 2130 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Device

Figure 22:
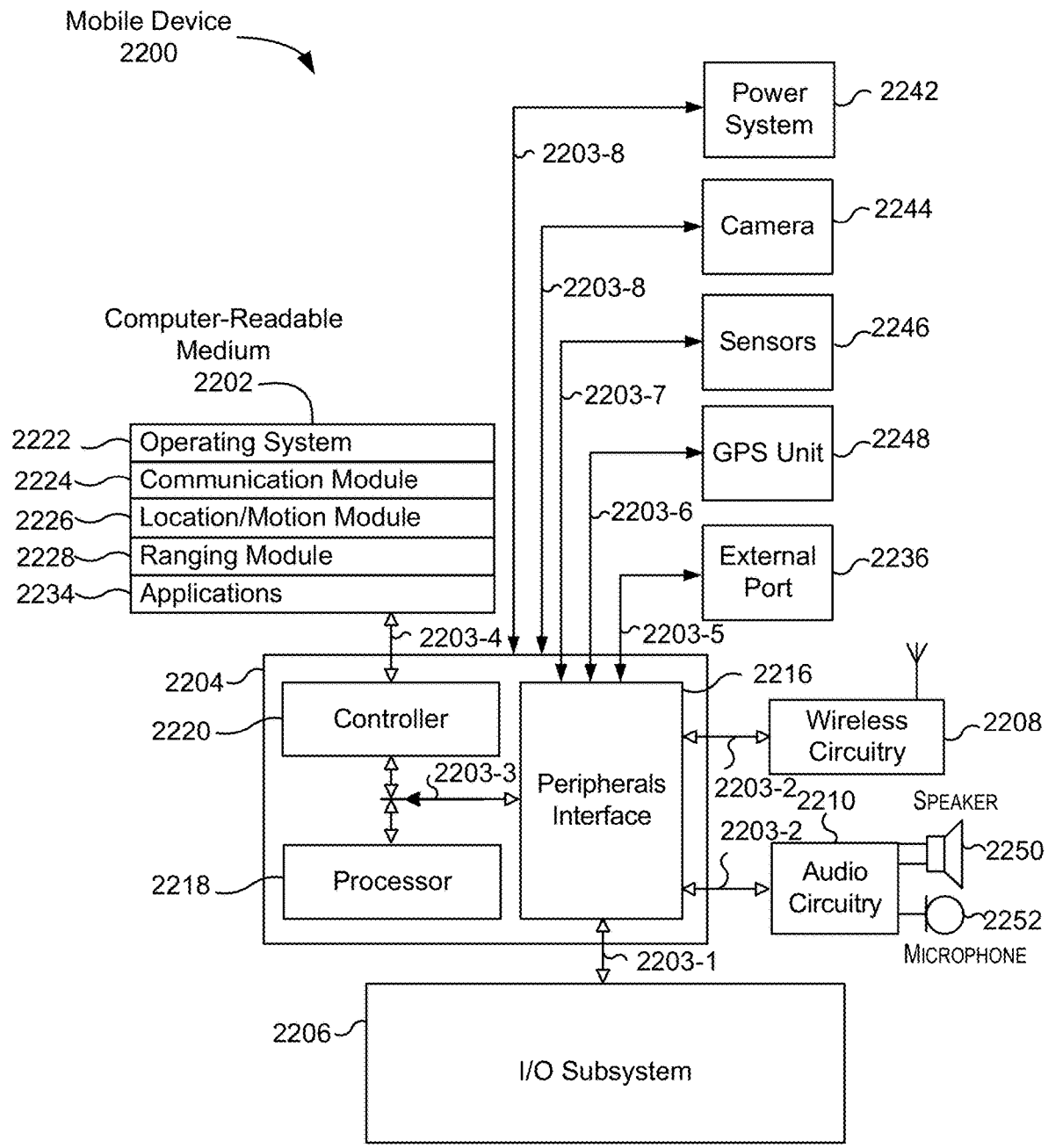
FIG. 22 is block diagram of an example device according to embodiments of the present disclosure.

FIG. 22 is a block diagram of an example electronic device 2200. Device 2200 generally includes computer-readable medium 2202, a processing system 2204, an Input/Output (I/O) subsystem 2206, wireless circuitry 2208, and audio circuitry 2210 including speaker 2212 and microphone 2214. These components may be coupled by one or more communication buses or signal lines 2203. Device 2200 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

it should be apparent that the architecture shown in FIG. 22 is only one example of an architecture for device 2200, and that device 2200 can have more or fewer components than shown, or a different configuration of components. The various components shown in FIG. 22 can be implemented in hardware, software, or a combination of both hardware and software, including one or more signal processing and/or application specific integrated circuits.

Wireless circuitry 2208 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 2208 can use various protocols, e.g., as described herein. In various embodiments, wireless circuitry 2208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 2208 is coupled to processing system 2204 via peripherals interface 2216. Peripherals interface 2216 can include conventional components for establishing and maintaining communication between peripherals and processing system 2204. Voice and data information received by wireless circuitry 2208 (e.g., in speech recognition or voice command applications) is sent to one or more processors 2218 via peripherals interface 2216. One or more processors 2218 are configurable to process various data formats for one or more application programs 2234 stored on medium 2202.

Peripherals interface 2216 couple the input and output peripherals of device 2200 to the one or more processors 2218 and computer-readable medium 2202. One or more processors 2218 communicate with computer-readable medium 2202 via a controller 2220. Computer-readable medium 2202 can be any device or medium that can store code and/or data for use by one or more processors 2218. Computer-readable medium 2202 can include a memory hierarchy, including cache, main memory and secondary memory. The memory hierarchy can be implemented using any combination of random access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 2216, one or more processors 2218, and controller 2220 can be implemented on a single chip, such as processing system 2204. In some other embodiments, they can be implemented on separate chips.

Processor(s) 2218 can include hardware and/or software elements that perform one or more processing functions, such as mathematical operations, logical operations, data manipulation operations, data transfer operations, controlling the reception of user input, controlling output of information to users, or the like. Processor(s) 2218 can be embodied as one or more hardware processors, microprocessors, microcontrollers, field programmable gate arrays (FPGAs), application-specified integrated circuits (ASICs), or the like.

Device 2200 also includes a power system 2242 for powering the various hardware components. Power system 2242 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 2200 includes a camera 2244. In some embodiments, device 2200 includes sensors 2246. Sensors can include accelerometers, compass, gyrometer, pressure sensors, audio sensors, light sensors, barometers, and the like. Sensors 2246 can be used to sense location aspects, such as auditory or light signatures of a location.

In some embodiments, device 2200 can include a GPS receiver, sometimes referred to as a GPS unit 2248. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 2218 run various software components stored in medium 2202 to perform various functions for device 2200. In some embodiments, the software components include an operating system 2222, a communication module 2224 (or set of instructions), a location module 2226 (or set of instructions), a ranging module 2228 that is used as part of ranging operation described herein, and other application programs 2234 (or set of instructions).

Operating system 2222 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 2224 facilitates communication with other devices over one or more external ports 2236 or via wireless circuitry 2208 and includes various software components for handling data received from wireless circuitry 2208 and/or external port 2236. External port 2236 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 2226 can assist in determining the current position (e.g., coordinates or other geographic location identifiers) and motion of device 2200. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 2226 receives data from GPS unit 2248 and analyzes the signals to determine the current position of the mobile device. In some embodiments, location/motion module 2226 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 2208 and is passed to location/motion module 2226. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 2200 based on the position coordinates of the corresponding transmitters. Regardless of the specific location technology used, location/motion module 2226 receives information from which a location fix can be derived, interprets that information, and returns location information, such as geographic coordinates, latitude/longitude, or other location fix data Ranging module 2228 can send/receive ranging messages to/from an antenna, e.g., connected to wireless circuitry 2208. The messages can be used for various purposes, e.g., to identify a sending antenna of a device, determine timestamps of messages to determine a distance of mobile device 2200 from another device. Ranging module 2228 can exist on various processors of the device, e.g., an always-on processor (AOP), a UWB chip, and/or an application processor. For example, parts of ranging module 2228 can determine a distance on an AOP, and another part of the ranging module can interact with a sharing module, e.g., to display a position of the other device on a screen in order for a user to select the other device to share a data item. Ranging module 2228 can also interact with a reminder module that can provide an alert based on a distance from another mobile device.

The one or more applications 2234 on device 2200 can include any applications installed on the device 2200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 2206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 2206 can include a display and user input devices such as a keyboard, mouse, and/or trackpad. In some embodiments, I/O subsystem 2206 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 2202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 2206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 2200 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a coordinator mobile device of N mobile devices that includes other mobile devices, N being an integer of three or more, the method comprising:
    detecting the other mobile devices using a first wireless protocol;
    accessing an active participant list in a memory of the coordinator mobile device, the active participant list comprising a plurality of unique identifiers assigned to each of the N mobile devices;
    transmitting the active participant list to the other mobile devices using the first wireless protocol;
    determining an order for a plurality of ranging operations between the N mobile devices by generating a table for a ranging session comprising multiple ranging operations using the plurality of unique identifiers in the active participant list, the table having one or more rows, each corresponding to a different time period, and one or more columns corresponding to one or more communication channels, wherein each entry of the table specifies a pair of mobile devices designated to perform a ranging operation during a particular time period using a particular communication channel; and
    for each of the other mobile devices:
        performing a ranging operation at the particular time period using the particular communication channel designated in the table, wherein each of the other mobile devices performs respective ranging operations based on timing from the coordinator mobile device and using a respective table specifying the order for the plurality of ranging operations.

2. The method of claim 1, further comprising:
    transmitting an advertising packet using a first wireless protocol;
    calculating a time until a subsequent active participation list is to be transmitted using a second wireless protocol; and
    transmitting, using the second wireless protocol, an acquisition packet containing the calculated time, the acquisition packet transmitted at a predetermined time period after transmitting the advertising packet.

3. The method of claim 1, wherein a first ranging operation comprises:
    performing a first ranging operation between a first mobile device and a second mobile device on the first wireless protocol, the first ranging operation comprising:

transmitting a first request message to the second mobile device at a first transmission time;

receiving a first response message from the second mobile device at a first reception time;

calculating a first distance between the first mobile device and the second mobile device based at least in part in a time difference between the first transmission time and the first reception time;

performing a second ranging operation between the first mobile device and a third mobile device, the second ranging operation comprising:

transmitting a second request message to the third mobile device at a second transmission time;

receiving a second response message from the third mobile device at a second reception time;

calculating a second distance between the first mobile device and the third mobile device based at least in part in a time difference between the second transmission time and the second reception time; and waiting a delay period following the second ranging operation prior to the second mobile device performing a third ranging operation between the second mobile device and a third mobile device, the delay period commencing following a reception of the second response message from the third mobile device.

4. The method of claim 1, wherein the coordinator mobile device for the ranging session is determined based in part on the plurality of unique identifiers assigned to each of the N mobile devices.

5. The method of claim 4, wherein the coordinator mobile device for the ranging session is determined by a particular mobile device of the N mobile devices with a lowest unique identifier.

6. The method of claim 5, wherein the lowest unique identifier is a universally unique identifier (UUID).

7. The method of claim 1, wherein the first wireless protocol comprises a side channel of a Wi-Fi signal.

8. The method of claim 1, wherein the first wireless protocol comprises a side channel of a Bluetooth signal.

9. The method of claim 1, further comprising periodically broadcasting the active participant list on the first wireless protocol.

10. The method of claim 1, further comprising:

receiving an identification message comprising a unique identifier not listed in the active participant list;

revising the active participant list by adding the unlisted unique identifier to the active participant list; and transmitting the revised active participant list on the first wireless protocol.

11. The method of claim 1, further comprising:

determining that an identification message for a select mobile device of the N mobile devices has not been received over a predetermined number of ranging sessions;

revising the active participant list by removing the unique identifier of the select mobile device from the active participant list; and transmitting the revised active participant list on the first wireless protocol.

12. The method of claim 1, wherein a coordinator for the ranging session is determined based in part on a plurality of determined distances between the N mobile devices.

13. The method of claim 1, further comprising determining a new coordinator following a second mobile device failing to receive a broadcast message from the coordinator mobile device after a predetermined duration of time.

14. A non-transitory computer-readable medium storing a plurality of instructions that, when executed by one or more processors of a coordinator mobile device of N mobile devices that includes other mobile devices, N being an integer of three or more, cause the one or more processors to perform operations comprising:

detecting the other mobile devices using a first wireless protocol;

accessing an active participant list in a memory of the coordinator mobile device, the active participant list comprising a plurality of unique identifiers assigned to each of the N mobile devices;

transmitting the active participant list to the other mobile devices using the first wireless protocol;

determining an order for a plurality of ranging operations between the N mobile devices by generating a table for a ranging session comprising multiple ranging operations using the plurality of unique identifiers in the active participant list, the table having one or more rows, each corresponding to a different time period, and one or more columns corresponding to one or more communication channels, wherein each entry of the table specifies a pair of mobile devices designated to perform a ranging operation during a particular time period using a particular communication channel; and for each of the other mobile devices:

performing a ranging operation at the particular time period using the particular communication channel designated in the table, wherein each of the other mobile devices performs respective ranging operations based on timing from the coordinator mobile device and using a respective table specifying the order for the plurality of ranging operations.

15. The non-transitory computer-readable medium of claim 14, wherein the coordinator mobile device for the ranging session is determined based in part on the plurality of unique identifiers assigned to each of the N mobile devices.

16. A method performed by a first mobile device of N mobile devices that includes other mobile devices, N being an integer of three or more, the method comprising:

receiving, using a first wireless protocol, greeting messages from the other mobile devices, wherein the greeting messages containing unique identifiers for each of the N mobile devices;

accessing, in a memory, a specified ordering of the N mobile devices, the specified ordering delineating an order for ranging operations between the N mobile devices, wherein the specified ordering is determined using the unique identifiers of the N mobile devices;

transmitting a start message at a start time, the start message comprising a start command to begin a ranging session comprising a plurality of ranging operations;

performing a first ranging operation with a second mobile device of the N mobile devices at a first predetermined time after the start time, the first predetermined time determined in accordance with the specified ordering; and performing a second ranging operation with a third mobile device of the N mobile devices at a second predetermined time after the start time, the second predetermined time determined in accordance with the specified ordering.

17. The method of claim 16, further comprising:

receiving an advertising packet using a third wireless protocol;

determining a first window for receiving an acquisition packet using a fourth wireless protocol based at least in part in a first time, the first time based on receiving the advertising packet;

receiving, using the fourth wireless protocol, the acquisition packet containing a calculated time for receiving a poll message, the acquisition packet transmitted at a predetermined time period after transmitting the advertising packet;

calculating a second window for receiving the poll message based at least in part on a second time and the calculated time, the second time based on receiving the acquisition packet; and receiving the poll message during the second window.

18. The method of claim 16, further comprising:

receiving a first response message at a second time from a second mobile device in response to the second mobile device receiving the start message;

calculating a first distance between the first mobile device and the second mobile device based at least in part on a first elapsed time between the first predetermined time and the second time;

receiving a second response message at a third time from a third mobile device during a listening period, the listening period occurring during a time window beginning a first preset time after transmitting the start message; and calculating a second distance between the first mobile device and the third mobile device based at least in part on a second elapsed time between the first predetermined time and the third time.

19. The method of claim 16, further comprising receiving a third distance between the second mobile device and the third mobile device, the third distance calculated by the second mobile device during a second ranging operation, the second ranging operation occurring a second preset time after a first ranging operation between the first mobile device and the second mobile device.

20. The method of claim 16, further comprising:

receiving a greeting message from a new mobile device to the ranging session; and revising the specified ordering in a memory of the first mobile device to include a new unique identifier for the new mobile device.

21. The method of claim 1, further comprising sending the table to each of other mobile devices.

22. The method of claim 1, wherein each of the other mobile devices generates the table using the active participant list and a process stored on each of the N mobile devices.

* * * * *

UNITED STATES PATENT AND TRADEMARK OFFICE
CERTIFICATE OF CORRECTION

| | | |
|---|---|---|
| PATENT NO. | : 11,057,743 B2 | Page 1 of 1 |
| APPLICATION NO. | : 16/784022 | |
| DATED | : July 6, 2021 | |
| INVENTOR(S) | : Yagil Burowski et al. | |

It is certified that error appears in the above-identified patent and that said Letters Patent is hereby corrected as shown below:

On the Title Page

In the Abstract please correct as shown below:
A mobile device can include ranging circuitry to determine distance to another mobile device. Ranging between multiple mobile devices can present challenges due to clock drift between the devices resulting in missed messages due to collisions between ranging messages. Techniques can be implemented to reduce the number of collisions by designating time slots for ranging sessions based on timing from a coordinator mobile device. Alternative techniques allow for splitting up channels at different time amounts for different pairs of devices. The ranging techniques can be used to share information between devices with a predefined distance for applications such as augmented reality.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*